US011537111B2

(12) United States Patent
Yang et al.

(10) Patent No.: US 11,537,111 B2
(45) Date of Patent: Dec. 27, 2022

(54) METHODS AND APPARATUS FOR 2-D AND 3-D SCANNING PATH VISUALIZATION

(71) Applicant: General Electric Company, Schenectady, NY (US)

(72) Inventors: Pinghai Yang, Niskayuna, NY (US); Hongqing Sun, West Chester, OH (US); Manuel Acosta, West Chester, OH (US); Ruben E. Fairman, West Chester, OH (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 16/837,721

(22) Filed: Apr. 1, 2020

(65) Prior Publication Data

US 2021/0311466 A1 Oct. 7, 2021

(51) Int. Cl.
*G05B 19/418* (2006.01)
*G05B 13/04* (2006.01)
*B23K 26/342* (2014.01)

(52) U.S. Cl.
CPC ..... *G05B 19/41885* (2013.01); *G05B 13/042* (2013.01); *B23K 26/342* (2015.10); *G05B 2219/40091* (2013.01); *G05B 2219/49023* (2013.01)

(58) Field of Classification Search
CPC ............ G05B 19/41885; G05B 13/042; G05B 2219/40091; G05B 2219/49023; B33Y 50/02; B23K 26/342; B22F 10/20; B22F 12/00; Y02P 10/25
See application file for complete search history.

(56) References Cited

U.S. PATENT DOCUMENTS

| | | | |
|---|---|---|---|
| 7,765,022 B2 | 7/2010 | Mazumder et al. | |
| 8,456,523 B2 | 6/2013 | Stork genannt Wersborg | |
| 8,467,978 B2 | 6/2013 | Huffman et al. | |
| 9,925,715 B2 | 3/2018 | Cheverton et al. | |
| 9,919,360 B2 | 5/2018 | Buller et al. | |
| 10,183,329 B2 | 1/2019 | Gunther | |
| 2014/0268520 A1* | 9/2014 | Murakami | B23K 26/18 361/679.01 |

(Continued)

OTHER PUBLICATIONS

Ansari, M.J., Nguyen, D.S. and Park, H.S., 2019. Investigation of SLM process in terms of temperature distribution and melting pool size: Modeling and experimental approaches. Materials, 12(8), p. 1272. (Year: 2019).*

*Primary Examiner* — Alicia M. Choi
(74) *Attorney, Agent, or Firm* — Hanley, Flight & Zimmerman, LLC

(57) ABSTRACT

Methods and apparatus for two-dimensional and three-dimensional scanning path visualization are disclosed. An example apparatus includes a parameter determiner to determine at least one of a laser beam parameter setting or an electron beam parameter setting, a melt pool geometry determiner to identify melt pool dimensions using the parameter setting, the melt pool geometry determiner to vary the parameter setting to obtain multiple melt pool dimensions, and a visualization path generator to generate a three-dimensional view of a scanning path for an additive manufacturing process using the identified melt pool dimensions. The visualization path generator adjusts the laser beam parameters based on the generated three-dimensional view.

19 Claims, 13 Drawing Sheets

(56) References Cited

U.S. PATENT DOCUMENTS

| | | | |
|---|---|---|---|
| 2014/0348692 A1* | 11/2014 | Bessac | B33Y 30/00 419/53 |
| 2015/0048064 A1 | 2/2015 | Cheverton et al. | |
| 2016/0059352 A1* | 3/2016 | Sparks | B23K 26/034 219/76.14 |
| 2016/0098825 A1 | 4/2016 | Dave et al. | |
| 2017/0249440 A1* | 8/2017 | Lang | A61F 2/4684 |
| 2017/0364058 A1* | 12/2017 | Jagdale | G05B 19/4099 |
| 2018/0065324 A1* | 3/2018 | Isobe | B22F 1/0018 |
| 2018/0127866 A1* | 5/2018 | Irumata | B22F 3/16 |
| 2018/0133801 A1* | 5/2018 | Buller | B33Y 30/00 |
| 2018/0250744 A1* | 9/2018 | Symeonidis | B23K 26/034 |
| 2018/0250770 A1* | 9/2018 | Graham | B33Y 30/00 |
| 2018/0250771 A1* | 9/2018 | Brown | B23K 15/0093 |
| 2018/0281113 A1 | 10/2018 | Carter et al. | |
| 2019/0039318 A1* | 2/2019 | Madigan | B22F 10/20 |
| 2019/0188346 A1* | 6/2019 | Mirabella | G06F 30/20 |
| 2019/0255654 A1* | 8/2019 | Beckett | B23K 26/032 |
| 2019/0275585 A1* | 9/2019 | Akram | B22F 10/20 |
| 2019/0337232 A1* | 11/2019 | Prabha Narra | G06F 30/23 |
| 2020/0122407 A1* | 4/2020 | Yamazaki | B29C 64/209 |
| 2021/0053278 A1* | 2/2021 | Addington | B29C 64/393 |
| 2021/0197275 A1* | 7/2021 | Sohn | B23K 26/067 |
| 2022/0011726 A1* | 1/2022 | Schwarz | G06N 3/082 |

\* cited by examiner

METHODS AND APPARATUS FOR 2-D AND 3-D SCANNING PATH VISUALIZATION

FIELD OF THE DISCLOSURE

This disclosure relates generally to additive manufacturing and, more particularly, to methods and apparatus for two-dimensional and three-dimensional scanning path visualization.

BACKGROUND

Additive manufacturing technologies (e.g., 3D printing) permit formation of three-dimensional parts from computer-aided design (CAD) models. For example, a 3D printed part can be formed layer-by-layer by adding material in successive steps until a physical part is formed. Numerous industries (e.g., engineering, manufacturing, healthcare, etc.) have adopted additive manufacturing technologies to produce a variety of products, ranging from custom medical devices to aviation parts.

BRIEF DESCRIPTION OF THE DRAWINGS

The figures are not to scale. Wherever possible, the same reference numbers will be used throughout the drawing(s) and accompanying written description to refer to the same or like parts.

BRIEF SUMMARY

Figure 1:
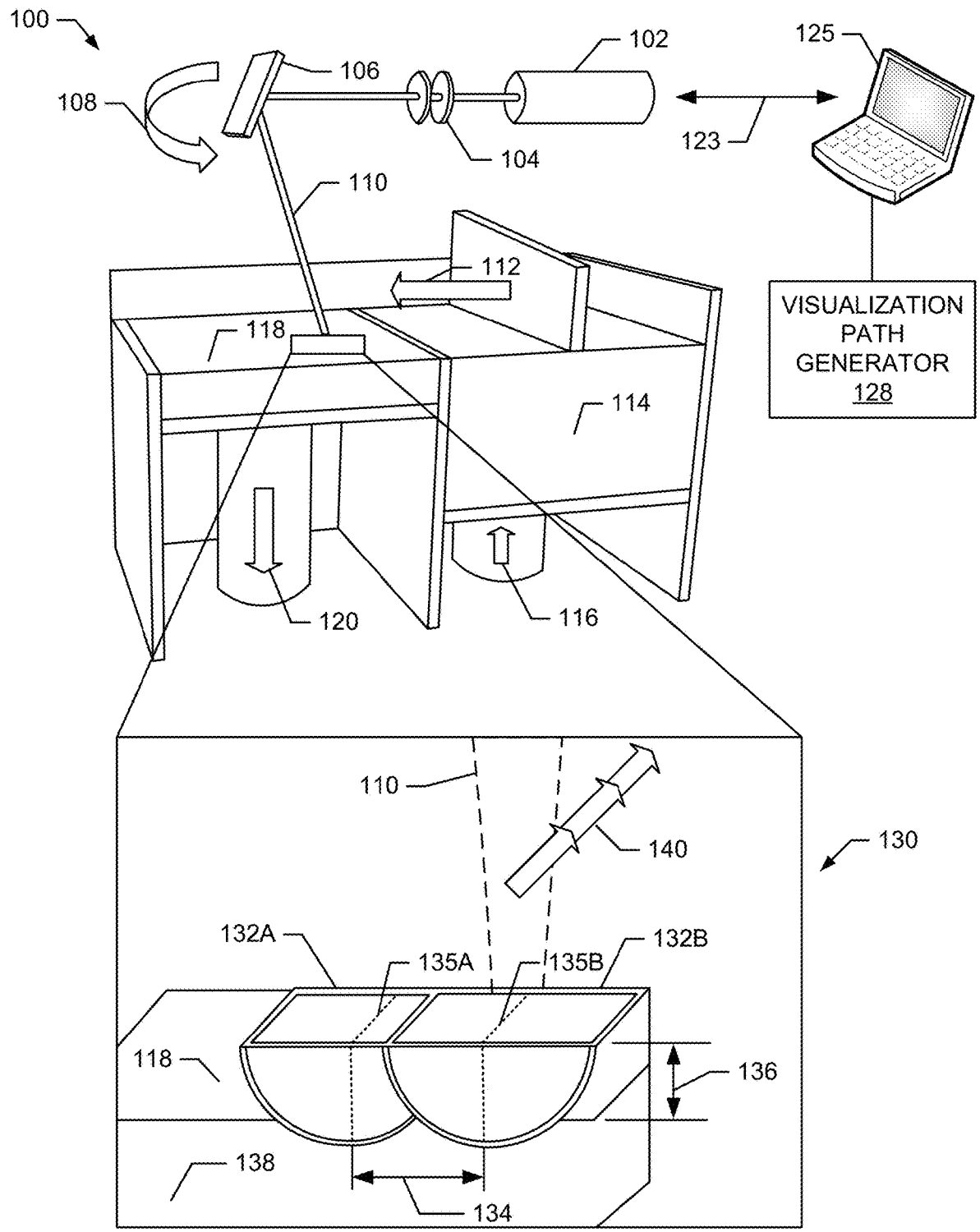
FIG. 1 illustrates an example additive manufacturing process in which the methods and apparatus disclosed herein can be implemented.

Methods and apparatus for two-dimensional and three-dimensional scanning path visualization are disclosed.

Certain examples provide an example apparatus including a parameter determiner to determine at least one of a laser beam parameter setting or an electron beam parameter setting, a melt pool geometry determiner to identify melt pool dimensions using the parameter setting, the melt pool geometry determiner to vary the parameter setting to obtain multiple melt pool dimensions, and a visualization path generator to generate a three-dimensional view of a scanning path for an additive manufacturing process using the identified melt pool dimensions, the visualization path generator to adjust the laser beam parameters based on the generated three-dimensional view.

Certain examples provide an example method including determining a laser beam parameter setting or an electron beam parameter setting, identifying melt pool dimensions using the parameter setting, the parameter setting varied to obtain multiple melt pool dimensions, generating a three-dimensional view of a scanning path for an additive manufacturing process using the identified melt pool dimensions, and adjusting the laser beam parameters based on the generated three-dimensional view.

Certain examples provide an example non-transitory computer readable storage medium including instructions that, when executed, cause a processor to at least determine a laser beam parameter setting or an electron beam parameter setting, identify melt pool dimensions using the parameter setting the parameter setting varied to obtain multiple melt pool dimensions, generate a three-dimensional view of a scanning path for an additive manufacturing process using the identified melt pool dimensions, and adjust the laser beam parameters based on the generated three-dimensional view.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, the terms "system," "unit," "module," "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, component, and/or systems shown in the attached figures may represent the hardware that operates based on software or hardwired instructions, the software that directs hardware to perform the operations, or a combination thereof.

Additive manufacturing (AM), also known as 3D-printing, permits the formation of physical objects from three-dimensional (3D) model data using layer-by-layer material addition. For example, consumer and industrial-type 3D printers can be used for fabrication of 3D objects, with the goal of replicating a structure generated using computer-aided design (CAD) software. Complex 3D geometries including high-resolution internal features can be printed without the use of tooling, with sections of the geometries varied based on the type of material selected for forming the structure. However, 3D printing requires the assessment of printing parameters, such as 3D printer-specific settings, to determine which parameters result in the highest quality build (e.g., limiting presence of defects and/or deviations from the original CAD-based model). Such a process is especially critical when 3D printed parts and/or objects are used in products intended for human use (e.g., aviation, medicine, etc.), as opposed to just prototyping needs. However, assessment of the parameters needed to improve 3D printed object quality is time consuming and expensive, given the need to run numerous tests and evaluate numerous 3D printed parts prior to identifying the parameters that are most appropriate for a given 3D printing process. Additionally, the parameters change from 3D printer to 3D printer, making the selection of parameters more intensive and introducing variations that are difficult to account for from one additive manufacturing process to another. Accordingly, methods and apparatus that permit an expedited and/or automated process of 3D printer-specific parameter adjustments would be welcomed in the technology.

AM-based processes are diverse and include powder bed fusion, material extrusion, and material jetting. For example, powder bed fusion uses either a laser or an electron beam to melt and fuse the material together to form a 3D structure. Powder bed fusion can include multi jet fusion (MJF), direct metal laser sintering (DMLS), direct metal laser melting (DMLM), electron beam melting (EBM), selective laser sintering (SLS), among others. For example, DMLM uses lasers to melt ultra-thin layers of metal powder to create the 3D object, with the object built directly from a CAD file (e.g., .STL file) generated using CAD data. Using a laser to selectively melt thin layers of metal particles permits objects to exhibit homogenous characteristics with fine details. A variety of materials can be used to form 3D objects using additive manufacturing, depending on the intended final application (e.g., prototyping, medical devices, aviation parts, etc.). For example, the DMLM process can include the use of titanium, stainless steel, superalloys, and aluminum, among others. For example, titanium can withstand high pressures and temperatures, superalloys (e.g., cobalt chrome) can be more appropriate for applications in jet engines (e.g., turbine and engine parts) and the chemical industry, while 3D printed parts formed from aluminum can be used in automotive and thermal applications.

Powder bed fusion techniques such as DMLM use a fabrication process that is determined by a range of controlled and uncontrolled process parameters. For example, laser control parameters (e.g., position, velocity, power) as well as powder layer parameters (e.g., material, density, layer height) should be well-defined and include specific combinations to permit adequate melting of adjacent laser scan tracks and/or the underlying substrate (e.g., previously melted layers). Experimental approaches to determine appropriate parameters combinations are cumbersome and require repetition when parameter adjustments are made. Any variation in a given parameter combination can further introduce defects that decrease the quality of the printed 3D object. For example, pore formation in the 3D printed object can be attributed to power-velocity parameter combination of the laser, including insufficient re-melting of an adjacent scan vector (e.g., resulting from a wide hatch spacing, which refers to the scan spacing or separation between two consecutive laser beams). For example, controlling the laser velocity and/or power profile along each scan vector can change occurrence of pore formation or allow for optimization and/or other improvement of other 3D printed object properties. During the melting process, the laser scanning parameters (e.g., laser size, laser shape, and/or laser scanning pattern) affect the formation of a melt pool. The melt pool is formed when the powder melts from exposure to laser radiation, such that the melt pool includes both a width and a depth determined by laser characteristics (e.g., laser power, laser shape, laser size, etc.). Control of the melt pool reduces presence of defects in the layer-by-layer build of a 3D object and subsequently determines the quality of the final output of the 3D printing process (e.g., object microstructure). Even minor deviations in object structure and/or geometry can result in changes in the ability of the printed part to withstand stress and/or perform a designated function, especially for applications that require parts of the highest possible quality (e.g., aviation parts, medical devices, etc.) rather than just for purposes of prototyping needs. As such, improvement of the 3D printing process is necessary, requiring assessment of melt pool characteristics, scan vectors, and/or layer formations that permit final printing features to be aligned with the original CAD file.

Examples disclosed herein describe methods and apparatus for 2D and 3D scanning path visualization as part of the 3D printing process. Example methods and apparatus disclosed herein permit users to directly assess a relationship between parameter sets and a resulting quality of the build (e.g., a final 3D printed object). For example, users can visualize a laser powder bed DMLM scan path in 2D and 3D based on measured and/or predicted melt pool geometries. Current techniques rely on the visualization of a scan path based on one-dimensional (1D) vectors in a layer-by-layer view, limiting the amount of information accessible to the user. In the examples disclosed herein, melt pool information can be used to generate 2D and 3D scanning paths based on input from CAD models. The examples disclosed herein permit visualization of not only the scan path itself, but also the anticipated quality of the 3D printed parts and/or objects (e.g., build density, surface roughness, porosity, etc.). While the direct metal laser melting (DMLM) process is used as an example to describe a potential implementation of the methods and apparatus disclosed herein, the methods and apparatus disclosed herein can be implemented in any other applicable additive manufacturing process (e.g., electron beam melting, direct energy deposition, etc.). Furthermore, the examples disclosed herein permit prediction of build quality for 3D printing machine qualification and industrialization, provide guidance to parameter development, and enable adaptive parameter and scanning strategy assignment for different applications.

FIG. 1 illustrates an example additive manufacturing process 100 in which the methods and apparatus disclosed herein can be implemented. The additive manufacturing process 100 includes a laser source 102, lenses 104, a scanning mirror 106, a laser beam 110, a leveling roller 112, a powder feed compartment 114, a powder feed piston 116, a print bed 118, and a build piston 120. The additive manufacturing process 100 also includes a computing system 125 in communication with system components of the additive manufacturing process 100, and a visualization path generator 128.

A powder bed fusion process (e.g., direct metal laser melting (DMLM), electron beam melting (EBM), selective laser melting (SLM), etc.) includes the use of a laser, an electron beam, and/or a thermal print head to melt and fuse material powder together. The process includes spreading of the powder material over previous layers (e.g., using a roller, blade, etc.), with a reservoir (e.g., powder feed compartment 114) providing a supply of fresh material powder. For example, a DMLM process can commence with a leveling roller 112 spreading a thin layer (e.g., 0.1 mm thick layer) of metal powder (e.g., stainless steel, titanium, aluminum, cobalt chrome, steel, etc.) on the print bed 118 of a build compartment. Based on a given .STL file, the laser beam 110 is directed to create a cross-section of the object by completely melting the metal particles on the print bed 118. For example, melting of the metal powder occurs where the laser beam 110 meets the top surface of the powder bed 118. The laser beam 110 is deflected off using the scanning mirror 106 and optics (e.g., lenses 104) to focus the beam 110 on the surface of the powder bed 118. The beam 110 is moved in the x and y plane using a galvanometer system 108 that permits rotation of the deflecting mirror(s) 106. Once a single layer is complete, the print bed 118 is lowered (e.g., using build piston 120) to allow the process to be repeated to form a subsequent layer, with a new layer of powder spread (e.g., using leveling roller 112 once the powder feed piston 116 raises the powder feed 114) across the previous layer. Once all layers have been fused and added, excess unmelted powder is removed during post processing (e.g., brushed or blown away, etc.).

An example path 130 of the laser beam 110 provides a view of a first melt pool 132A and a second melt pool 132B formed during melting of the metal powder on the powder bed 118. For example, a separation between two consecutive laser beams creates a scan spacing, such as the hatch spacing 134, measured based on a distance from a center of one laser beam 110 scan (e.g., a first melt pool center 135A) to a center of another laser beam 110 scan (e.g., a second melt pool center 135B). The hatch spacing 134 can be varied based on, for example, the laser beam 110 spot size setting (e.g., a larger laser spot size results in a larger hatch spacing). An overlap between the melt pools 132A, 132B permits improved fusion of the melted metal powder to eliminate the presence of porosity. Heat introduced by the laser beam 110 onto the powder bed 118 is not homogenous throughout the laser diameter, with the highest temperature occurring at the innermost region (e.g., due to Gaussian temperature distribution of the laser beam 110). For example, laser power at a center of the laser beam 110 is higher than at the boundary of the scan, such that melting occurs at the center (e.g., at melt pool center(s) 135A, 135B) while heating occurs at the boundary (e.g., increased melt pool overlap reduces heating-only areas). As such, a layer thickness 136 formed can be thicker at the center 135A, 135B of the melt pools 132A, 132B when compared to the boundaries of the melt pools 132A, 132B.

A number of process parameters affect the microstructure and mechanical properties of a 3D printed object using the powder bed fusion process, including scanning speed (mm/s) (e.g., example scanning speed 140), beam speed/speed function, beam current (beam power, W), layer thickness (mm) (e.g., layer thickness 136), and line offset (e.g., hatch spacing 134). Such parameters can be adjusted to result in desired 3D printed object properties. For example, beam power, scan speed, hatch spacing 134, and layer thickness 136 affect the energy density (e.g., average applied energy per volume of material, $J/mm^3$). In some examples, the beam speed 140 can be adjusted near an edge of the object to prevent overheating. In some examples, the melt pool 132A, 134B overlap can be varied to control surface roughness, determine the level of porosity and/or vary the layer thickness. In some examples, an overlap of melt pools 132A, 132B that is too small results in metal particles that are not fully fused together (e.g., causing an increase in the number and size of defects). In some examples, an overlap of melt pools 132A, 132B that is too large results in an accumulation of heat and thermal deformation of the part layers, also resulting in defect formations. Layer thickness 136 (e.g., 50-150 um) affects the geometric accuracy of a fabricated object and can be varied depending on the type of 3D printer used, as well as other process parameters such as material powder particle size. Additionally, the scanning pattern and scanning speed 140 also affect the final 3D printed object microstructure and porosity. For example, a scanning pattern (e.g., cross-section of layer) represents the geometric track of the electron beam and/or laser beam 110 used to melt the metal powder to form a cross-section on the powder bed 118. Such geometries can include outer contours, inner contours, and/or the hatch pattern (e.g., formed based on the hatch spacing 134). The size of the area of the print bed 118 exposed to the laser beam 110 also affect material properties, given than heat conduction in larger melt pools 132A, 132B is slower compared to smaller melt spots. For example, material melted on the print bed 118 using a larger melt pool allows a more homogenous formation of the material with increased connection of the melted material with underlying layers 138 of a given build.

The additive manufacturing process 100 also includes a computing system 125 and a visualization path generator 128. The computing system 125 may include disk arrays or multiple workstations (e.g., desktop computers, workstation servers, laptops, etc.) in communication with one another. In the illustrated example of FIG. 1, the computing system 125 is in communication 123 with the additive manufacturing process 100 system components via one or more wired and/or wireless networks. Such a network can be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

The example visualization path generator 128 of FIG. 1 can include hardware, software, firmware, robots, machines, etc. structured to generate a three-dimensional view of the scan path used by the laser 110 by determining the melt pool 132A, 132B geometry (e.g., width, depth, etc.) based on laser 110 parameters, as described in more detail in connection with FIG. 2. For example, the visualization path generator 128 can be used to adjust the melt pool 132A, 132B geometry to result in a 3D printed object that is devoid of defects by automatically adjusting laser 110 parameters (e.g., laser power, laser spot size, laser speed, etc.) based on the generated 3D view of the scan path. In some examples, a user of the additive manufacturing process 100 can adjust laser parameters based on the 3D view of the scan path generated by the visualization path generator 128. As such, the visualization path generator 128 introduces increased control over the additive manufacturing process 100 by generating one or more 3D model(s) of the object to be printed based on the anticipated scan path and melt pool geometry determined using the laser parameter settings. Additionally, the visualization path generator 128 can show an object scan path layer-by-layer or as a full 3D view that indicates areas where a potential defect and/or deviation from object surface homogeneity can occur as a result of the selected laser parameters and/or other 3D-printer settings.

Figure 2:
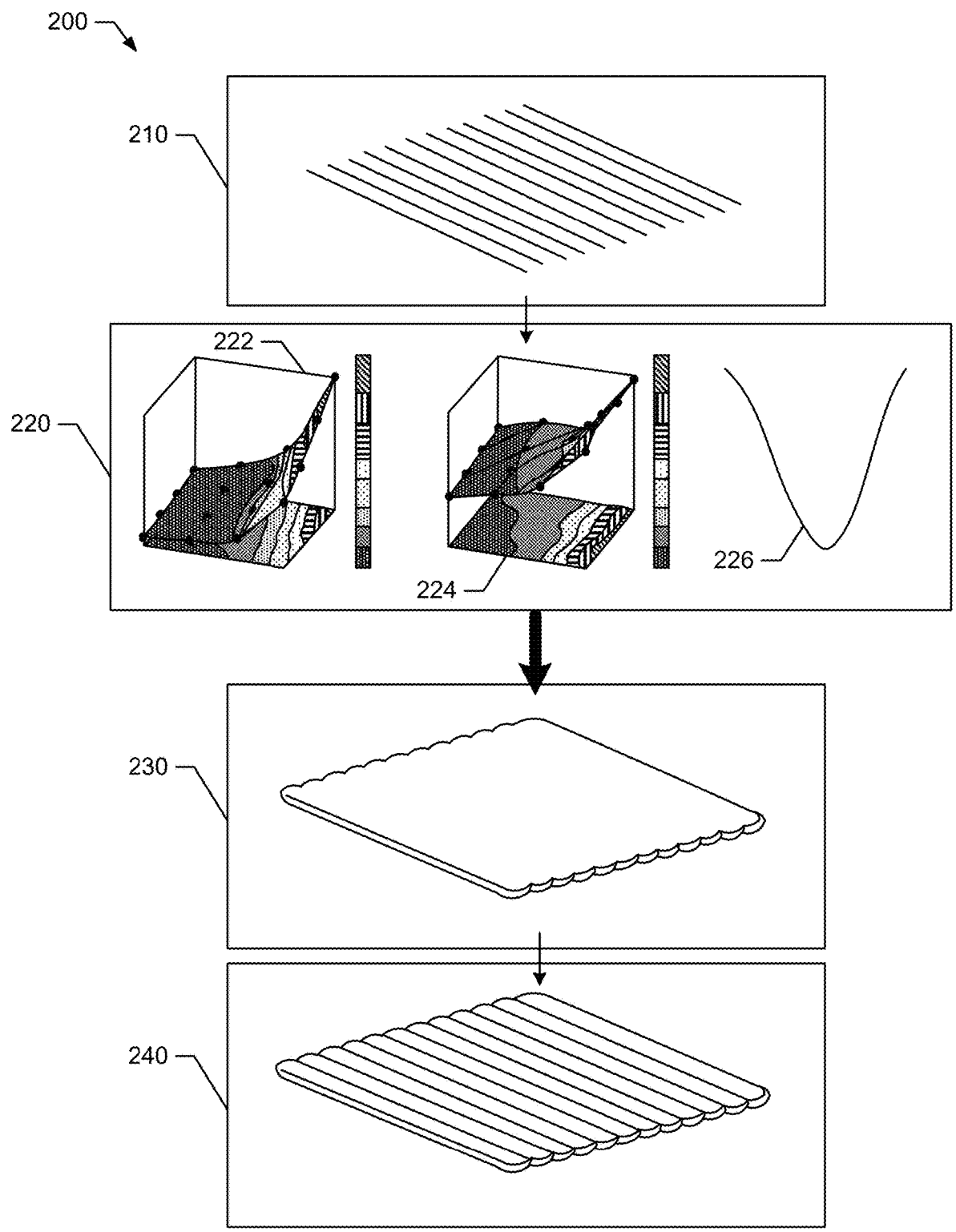
FIG. 2 illustrates an example process of generating a three-dimensional scanning path visualization using the example additive manufacturing process of FIG. 1.

FIG. 2 illustrates an example process 200 of generating a three-dimensional scanning path visualization using the example additive manufacturing process 100 of FIG. 1. In the example of FIG. 2, an imported laser profile toolpath 210, a melt pool geometry database 220, a 3D solid toolpath with lofting 230, and a melt-based partition of the 3D solid toolpath 240 are illustrated. As used herein, lofting refers to surfaces and/or solids generated from a section curve positioned along a path curve. For example, CAD-based drafting techniques permit lofting when designing 3D structures, such that a 3D solid or surface can be formed by specifying a series of cross sections which define the shape of the resulting solid or surface. In the examples disclosed herein, the melt pool shape 226 of FIG. 2 represents the section curve used to generate a 3D surface and/or solid, with the path curve representing the scan path.

The imported laser profile toolpath 210 represents a 2D polyline of the laser beam 110 profile. For example, toolpaths can be assigned to an object cross-section 2D geometry created using CAD and/or any other application that can be used for generating 3D printer-compatible files. The profile toolpath 210 creates a cut line along and/or around a given CAD-designed object's vectors, as described in more detail in association with FIG. 6A. For example, the laser profile toolpath 210 can represent the path that the laser beam 110 will travel during the formation of a 2D layer on the powder bed 118.

The melt pool geometry database 220 can be formed based on a variety of processing condition inputs (e.g., laser speed, spot size, etc.) in order to yield melt pool 132A, 132B geometries (e.g., depth and/or width of the melt pool 132A, 132B). In some examples, the melt pool geometry database 220 can be generated using response surface models, as described in more detail in connection with FIGS. 3A-3D. For example, a first response surface 222 can be generated for a first laser spot size and a second response surface 224 can be generated for a second laser spot size. Using the response surface(s) 222 and/or 224, a melt pool shape 226 can be determine for the given set of parameters and/or inputs (e.g., laser speed, spot size, etc.). However, any other type of assessment can be performed in order to generate the melt pool geometry database 220 of FIG. 2 and is not limited to the use of response surface models.

The 3D solid toolpath with lofting 230 represents a 3D melt pool shape determined based on the input laser profile toolpath (e.g., laser profile toolpath 210) and the generated melt pool geometry database 220. For example, based on the melt pool geometry determined during the database 220 development, the melt pool shape 226 is replicated to allow for 3D visualization of the toolpath, including lofting (e.g., sloping edge formation).

The melt-based partition of the 3D solid toolpath 240 permits 3D visualization of partitioning based on a given number of times that a layer has been melted, as described in more detail in connection with FIGS. 4A-4B. For example, based on the number of times a given layer is melted (e.g., on the cross-section formed by the melted powder as the laser beam 110 outlines a given scanning pattern), the cross-section of the object being printed will be changed (e.g., increased homogeneity, increased pore formation, increased presence of defects, etc.). Such changes can be visualized in 3D as shown using the 3D solid toolpath 240 using the methods and apparatus described herein and presented in more detail in connection with FIGS. 3-11.

FIGS. 3A-3D illustrate example response surface model(s) 300, 325, 350, and 375 determined using the example process 200 of generating a three-dimensional scanning path visualization of FIG. 2. For example, response surface model(s) 300, 325 represent melt pool geometries for a smaller laser beam 110 spot size (e.g., spot size=75 um), while response surface diagram(s) 350, 375 represent melt pool geometries for a larger laser beam 110 spot sizepowder (e.g., spot size=125 um). The response surface models show transfer functions between 3D printing process parameters (e.g., laser power, laser speed, and spot size) and melt pool geometry dimensions (e.g., melt pool 132A, 132B depth and/or width). For example, the response surface model(s) 300 and 350 to determine the depth of the melt pool(s) 132A, 132B at a spot size of 75 um and the response surface model(s) 325 and 375 to determine the depth of the melt pool(s) 132A, 132B at a spot size of 125 um can be based on Equations 1 and 2 below with example transfer functions F1 and F2:

$$Depth=F1(speed,power,spot\text{-}size) \quad (1)$$

$$Width=F2(speed,power,spot\text{-}size) \quad (2)$$

For example, inputs to the first transfer function F1 (e.g., a polynomial function) include laser speed 310 (e.g., 400-1600 mm/s), laser power 312 (e.g., 200-350 W), and laser spot size (e.g., 75 um, 125 um, etc.). Inputs to the transfer function F1 result in an output (e.g., Depth) indicating the depth 305 of the melt pool (e.g., 10-600 um). As the laser parameters change, the output values for the melt pool depth 305 are adjusted accordingly. Similarly, inputs to the second transfer function F2 include the same laser parameter inputs as the laser parameter inputs to F1 in order to determine the melt pool width 308 (e.g., 80-250 um). As such, the melt pool 132A, 132B geometry can be determined using the output depth 305 and width 308 values for the corresponding laser parameter inputs of laser speed 310, laser power 312, and/or laser spot size. In the examples of FIGS. 3A-3D, an array of black dots represent experimental data sets (e.g., data point 314 of FIG. 3A). The experimental data sets include speed 310, power 312, spot-size and corresponding melt pool width and depth. As such, this data is used to interpolate and/or fit a polynomial transfer function (e.g., F1, F2) in order to generate the response surface models of FIGS. 3A-3D.

Figure 3A:
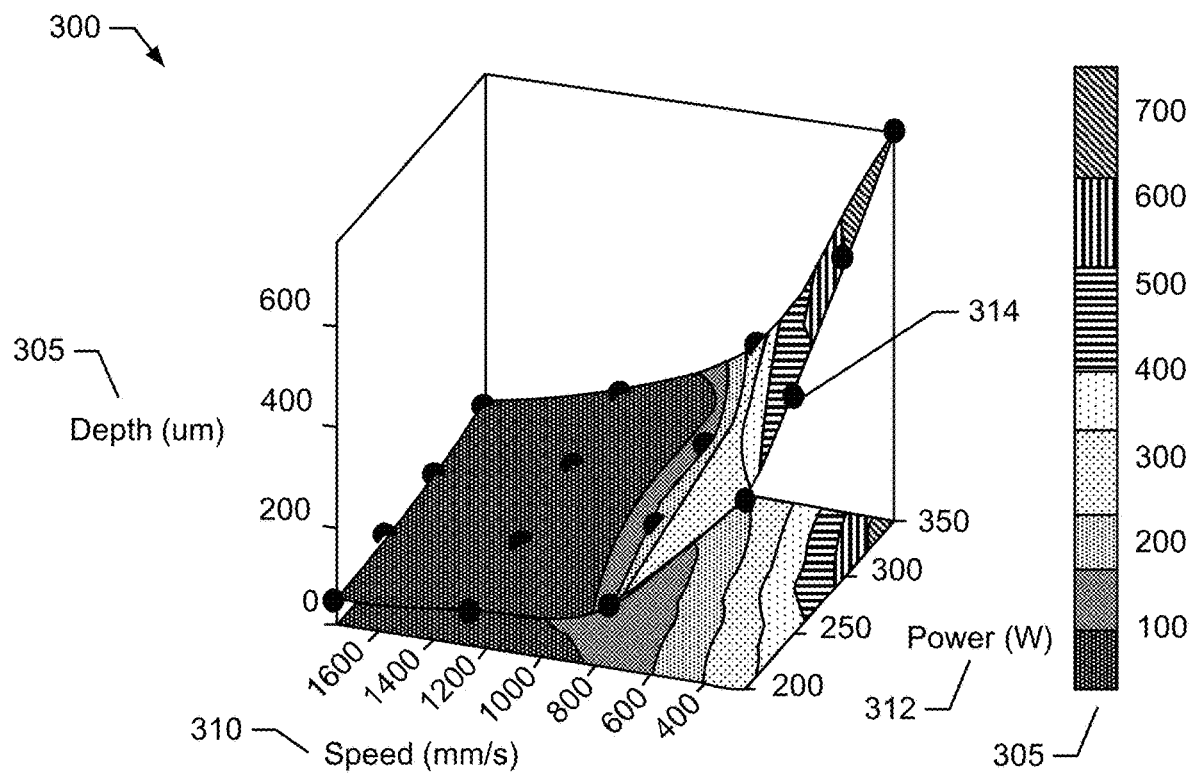
FIGS. 3A-3D illustrate example response surface diagrams determined using the example process of generating a three-dimensional scanning path visualization of FIG. 2.
Figure 3B:
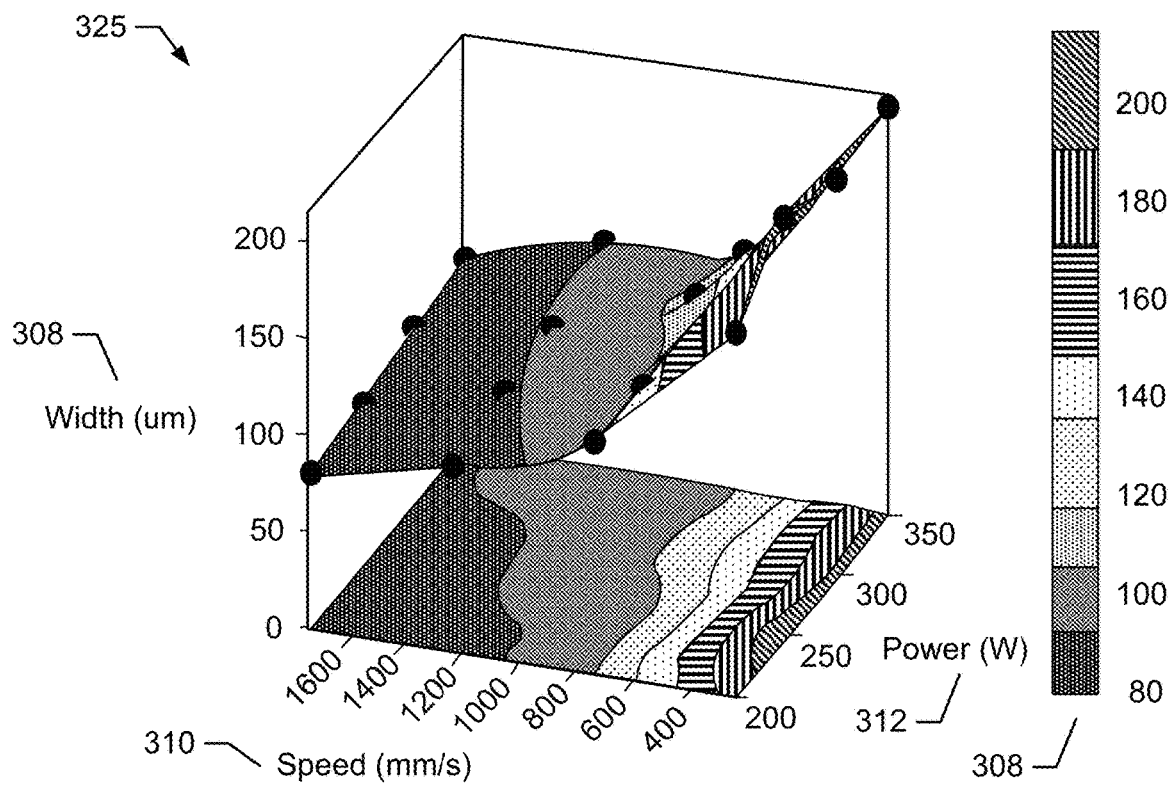
Figure 3C:
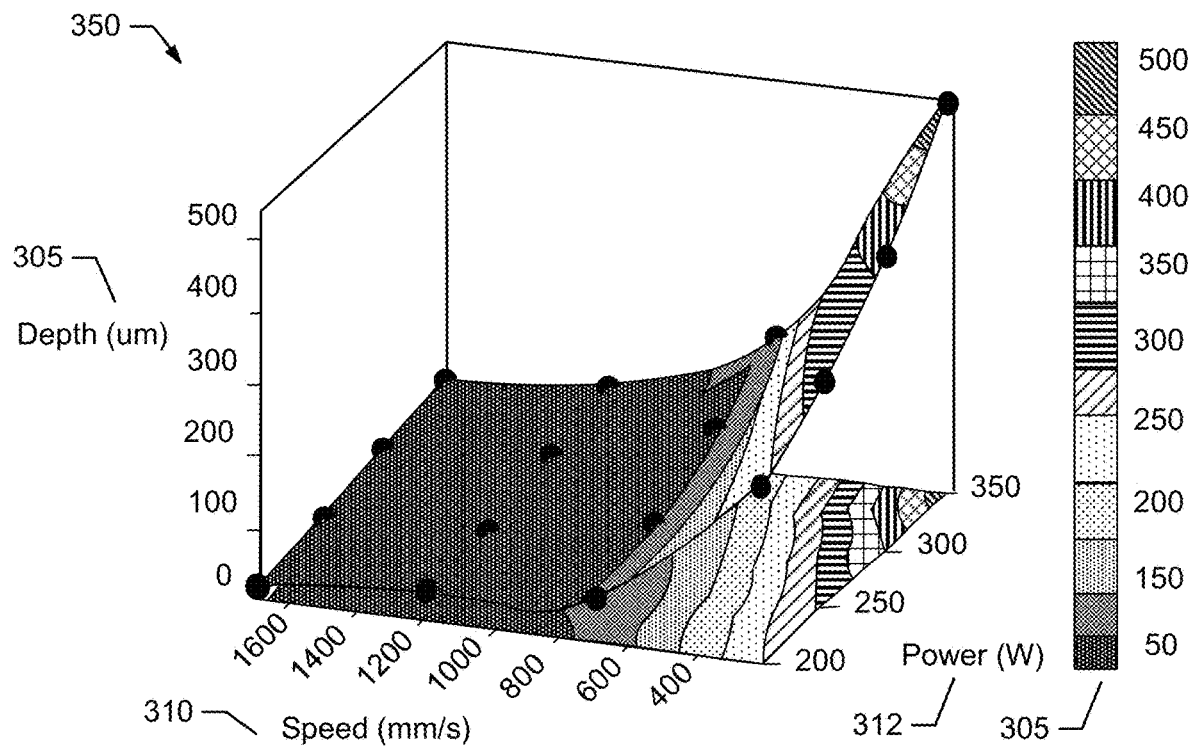
Figure 3D:
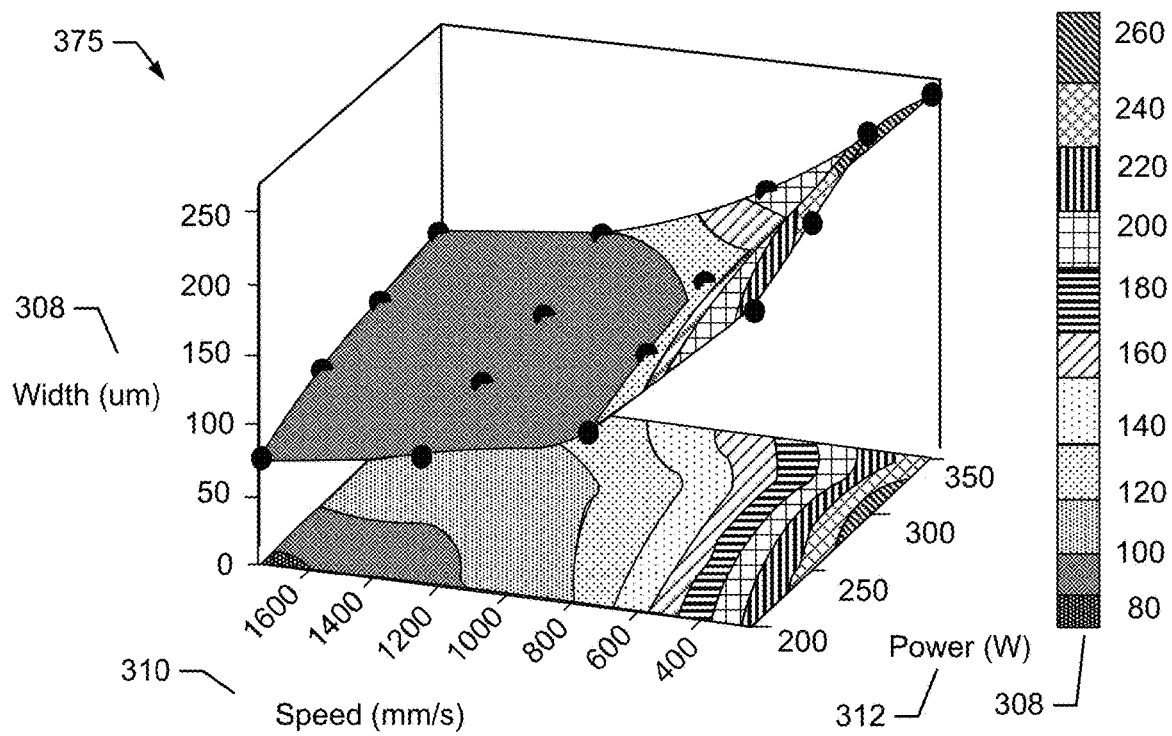

In the examples of FIGS. 3A-3D, the x-axis represents speed 310, the y-axis represents power 312, and the z-axis represents melt pool depth 305 and/or width 308. As such, using the determined depths and widths for a melt pool geometry at a given laser spot size, the melt pool shape can be determined as a half ellipse (e.g., melt-pool geometry 226), as shown in connection with FIG. 2. In the examples of FIGS. 3A and 3C, a smaller laser beam 110 spot size (e.g., decreased beam diameter) results in a deeper melt pool 132A, 132B formation when compared to a larger laser beam 110 spot size (e.g., increased beam diameter). For example, the penetration depth 305 of the melt pool 132A, 132B is lower when using a larger beam diameter (e.g., as shown in FIG. 3C) when compared to the penetration depth 305 of the melt pool when using a smaller beam diameter (e.g., as shown in FIG. 3A). Increased scanning speed 310 results in diminished melt pool penetration depth 305, given that the laser energy is more dispersed and not as concentrated into the print bed 118 substrate and/or the underlying layer(s) 138. In comparison, the penetration width 308 of the melt pool 132A, 132B is smaller when using a smaller beam 110 diameter (e.g., as shown in FIG. 3B) and increases as the laser beam 110 diameter increases (e.g., as shown in FIG. 3D). As such, melt pool geometries (e.g., melt pool depth 305 and/or melt pool width 308) can be determined using a set of parameters (e.g., laser speed (mm/s) 310, laser beam spot size, laser beam power (W), etc.).

Figure 4A:
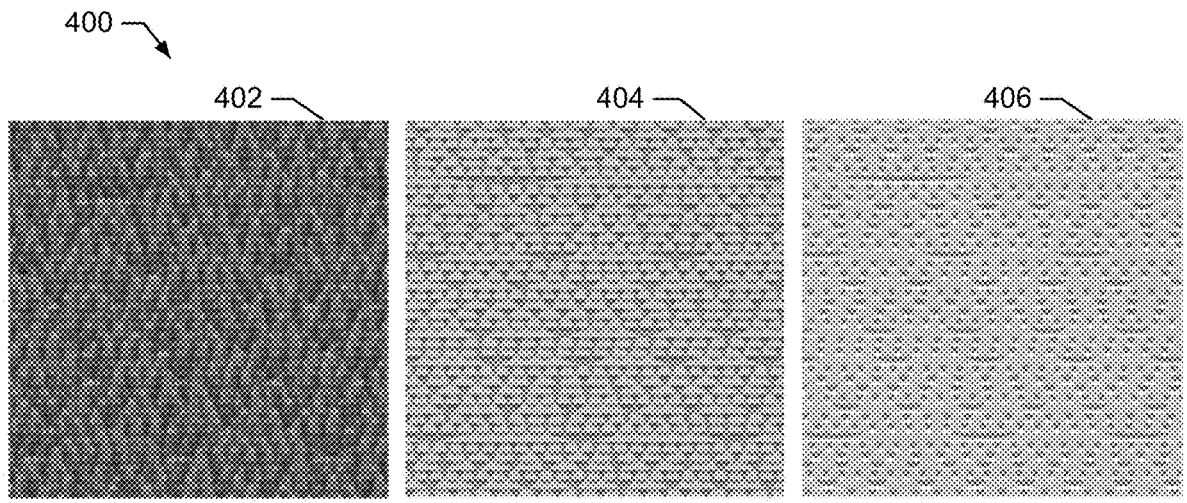
FIG. 4A illustrates example two-dimensional scanning paths based on input parameters as part of generating a three-dimensional scanning path visualization of FIG. 2.

FIG. 4A illustrates example two-dimensional (2D) scanning paths 400 based on input parameters as part of the three-dimensional scanning path visualization process 200 of FIG. 2. For example, based on user-specified parameters (e.g., inputs of laser speed, spot size, power, etc.), the user can visualize the impact of the given set of parameters on the build quality of the object to be 3D printed, thereby being able to modify the parameters to achieve the intended build quality (e.g., free of defects, etc.). In the example of FIG. 4A, part of the build quality can be evaluated based on whether there is too much burn back 402, adequate amount of fusion 404, and/or a lack of fusion 406. The half-circle patterns shown in FIG. 4A correspond to the melt pool geometry 226 of FIG. 2 that can be determined based on the example response surface models of FIGS. 3A-3D. Given that the laser-specific parameters (e.g., power, speed, spot size, etc.) can change during the build to accommodate a specific section of the build (e.g., specific layer and/or edge of object being 3D printed), the melt pool geometry 226 likewise changes and can be modified based on the parameter set for various features of the build (e.g., bulk area, contour area, downskin area, etc.). For example, a specific build strategy may include selection among specific parameter settings, including powder bed (e.g., particle distribution, layer thickness, etc.), bulk, contour, up- and down-skin parameters, hatch distance, scan vector rotation, etc. For example, FIG. 4A provides a 2D cross-sectional view illustrating a scanning path that includes bulk and contour melt pool geometries, such that the user can visualize the bulk density and contour surface quality. In the example of too much burn back 402, the darker regions correspond to increased melting (e.g., increased number of melts) at the given layer. In the example of an adequate amount of particle fusion 404, the number of overlapping darker regions is reduced, as compared to when there is too much burn back 402. For example, an adequate amount of particle fusion 404 indicates that the number of times the layer has been melted is reduced and is enough to fuse the particles together to create a homogenous part, such that the layer is neither over-melted or under-melted (e.g., lack of particle fusion). In the example of a lack of particle fusion 406, the decreased number of melts results in increased white areas that represent potential formation of porosity due to lack of fusion. As such, too much burn back 402 and/or a lack of particle fusion 406 can introduce defects into the build. However, the ability to view a 2D representation of the scanning path(s) based on designated parameters allows identification of the anticipated build quality and permits correction and/or modification of the parameters to eliminate and/or reduce the occurrence of defects in the final 3D printed object. While in some examples a user can select and/or modify parameters to achieve a higher quality of the build, this can likewise be achieved based on computer-based optimization and/or modeling using the disclosed methods and apparatus, such that the parameters can be adjusted automatically to reduce any defects and/or improve the quality of the build to ensure maximum adherence to the original object design (e.g., using a CAD model).

Figure 4B:
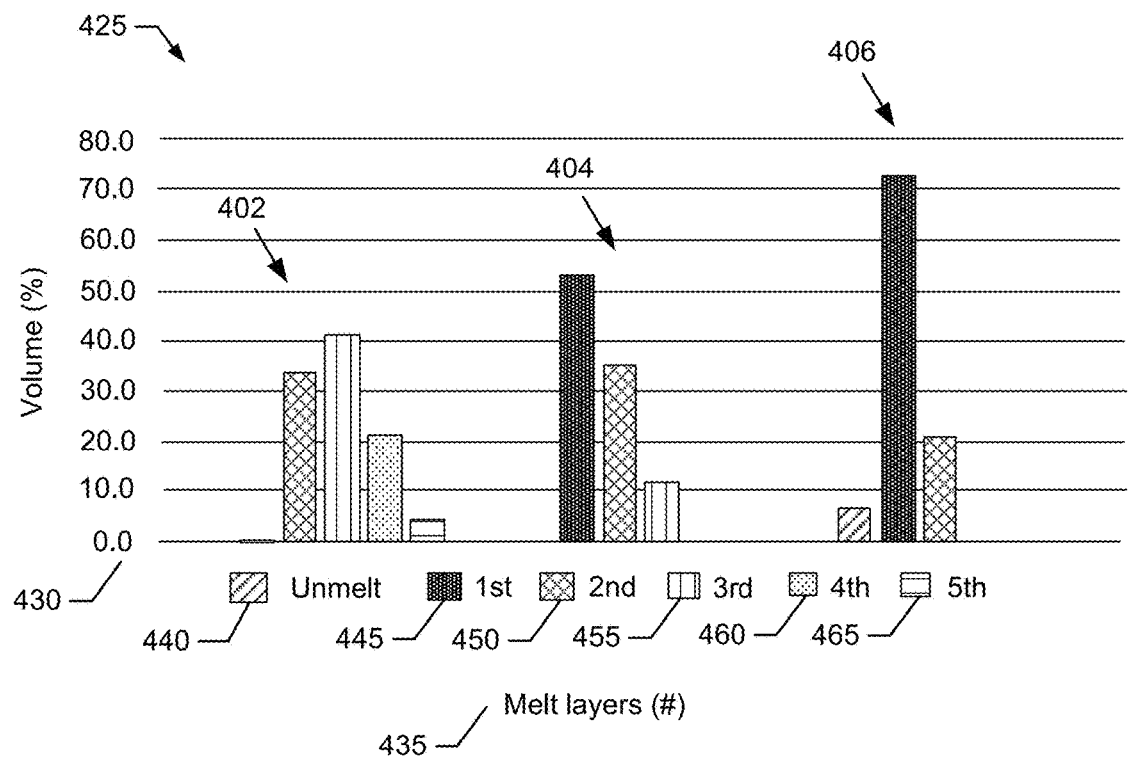
FIG. 4B illustrates example percentage of volume melted based on a melt layer as part of the two-dimensional scanning paths of FIG. 4A.

FIG. 4B illustrates an example quantitative assessment 425 of a percentage of volume melted based on a melt layer as part of the two-dimensional scanning paths 400 of FIG. 4A. For example, based on the scanning paths 400 (e.g., producing too much burn back 402, adequate amount of fusion 404, and/or a lack of fusion 406), the quantitative assessment 425 of an example percentage of volume melted 430 can be performed to identify the percentage of material melted a given number of times (e.g., represented by melt layers 435, including an un-melted layer 440, a once-melted layer 445, a twice-melted layer 450 twice, a three-times melted layer 455, a four-time melted layer 460, and/or a five-times melted layer 465, etc.). In the example of too much burn back 402, ~40% of the material per volume has been melted a total of three times (e.g., the melt layer 455). In the example of an adequate amount of fusion 404, ~52% of the material has been melted once only (e.g., the melt layer 445), while in the example of a lack of fusion 406, up to ~72% of the material has been melted only once (e.g., the melt layer 445). As such, the assessment of potential build quality can be performed not only using a visual representation of the scan path, but also a quantitative assessment 425 of the volume of material that is melted using a given scan path and/or a given build strategy (e.g., contour area, down-skin area, bulk area, etc.).

Figure 5:
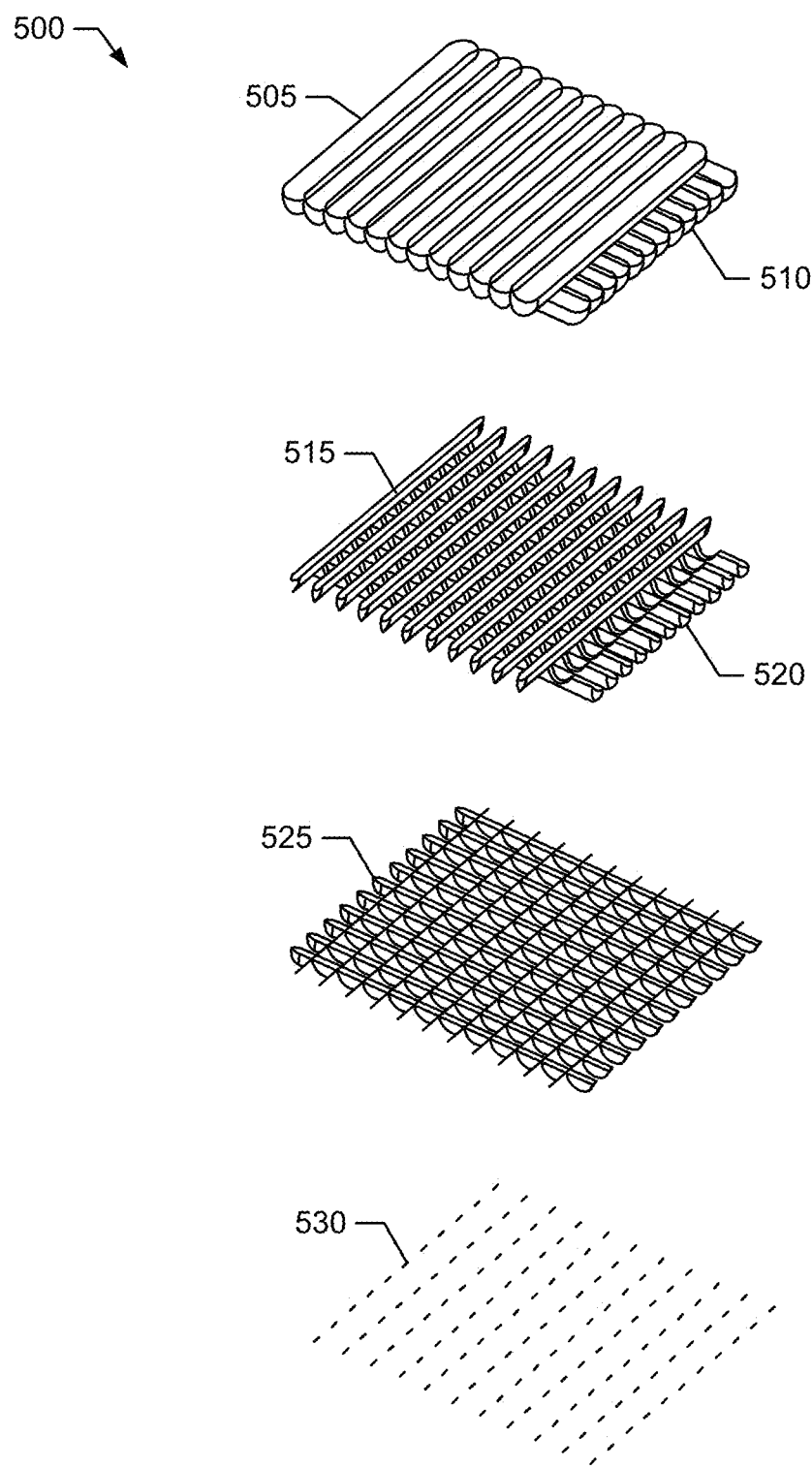
FIG. 5 illustrates an example three-dimensional geometry of a given number of melts based on the three-dimensional scanning path visualization of FIG. 4A.

FIG. 5 illustrates an example three-dimensional geometry 600 of a given number of melts 435 based on the three-dimensional scanning path visualization 400 of FIG. 4A. In the example of FIG. 5, a one melt layer 505 represents the scan path taken by the laser beam 110 and associated melt pool geometry 226 that results based on a given set of parameters, as described in association with FIGS. 3A-3D. For example, the layer formed during a single melt follows the laser profile toolpath 210 outline to form the crisscrossed pattern shown as part of the one melt layer 505, which includes a lower region 510. An example geometry with a total of two melt layers 515, with a lower region 520 of the twice-melted geometry, indicates the 3D view of the object layer when two passes of the laser beam 110 have been made. Likewise, an example geometry formed using a total of three melts 525 and an example geometry formed using a total of four melts 530, indicate how the structure of a given object layer can change as the total number of melts increases. As such, this can also serve, in some examples, as a visual aid to better understand how a given number of melt layers can affect the final 3D printed object geometry.

Figure 6A:
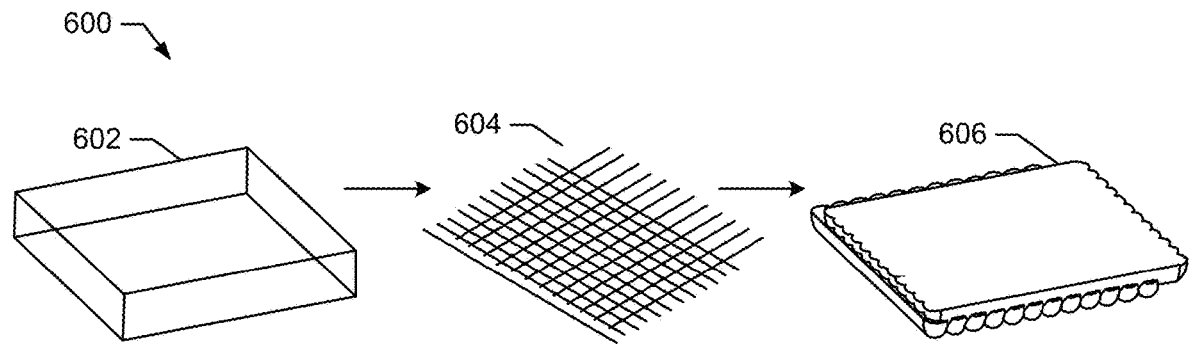
FIG. 6A illustrates an example three-dimensional scanning path determined using an example laser profile as part of the example additive manufacturing process of FIG. 1.
Figure 6B:
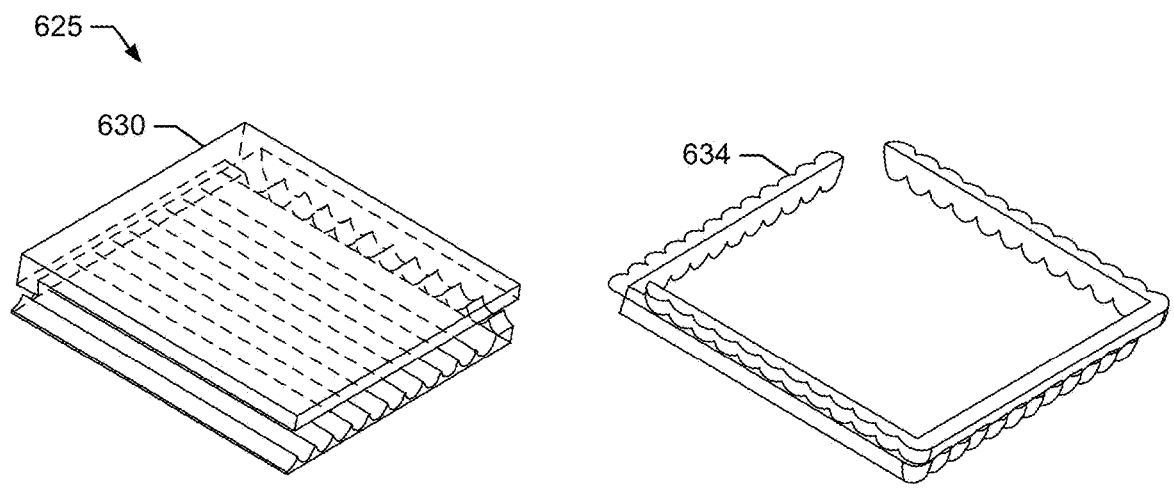
FIG. 6B illustrates an example identification of negative shape deviation and positive shape deviation based on the three-dimensional scanning path visualization of FIG. 6A.

FIG. 6A illustrates an example three-dimensional scanning path 600 determined using an example laser profile as part of the additive manufacturing process 100 of FIG. 1. In the example of FIG. 6A, a CAD model 602 is used with a laser beam tool path 604 to create the as-weld object geometry 606, which provides a 3D view of the object geometry based on the tool path 604 and/or parameter settings (e.g., laser speed, laser beam spot size, laser power, etc.). In some examples, the 3D view of the as-weld object geometry 606 can be adjusted based on changes in the given settings and/or build strategy (e.g., contour areas, down-skin areas, bulk areas, etc.). In some examples, the 3D view of the as-weld object geometry 606 can be used to visualize and/or estimate shape deviations and/or discrepancies. For example, FIG. 6B illustrates an identification 625 of negative shape deviation 630 and positive shape deviation 634 based on the three-dimensional scanning path 600 visualization of FIG. 6A. In the negative shape deviation 630, build areas with a lack of fusion can contribute to a lack of material presence in some areas of the build. In the positive shape deviation 634, an additional amount of material is present in the overhang region of the build. As a result, visual verification of a positive and/or negative shape deviation allows for optimization of parameters to avoid and/or minimize such shape deviations, such that the scan path 604 can be updated to reduce the one or more discrepancies (e.g., a new scan path can be added to the negative shape deviation 630 which exhibits a lack of fusion).

Figure 7:
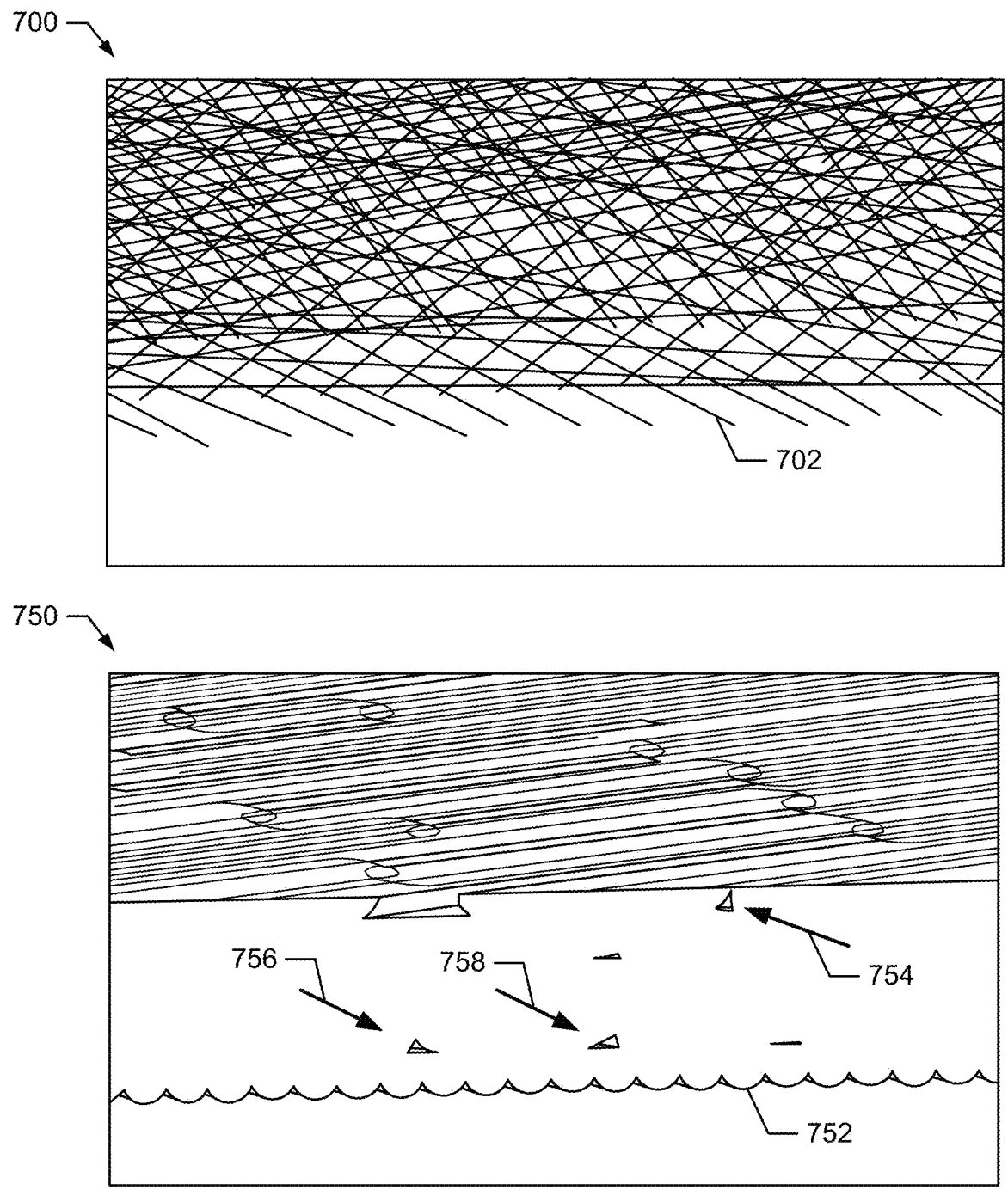
FIG. 7 illustrates example two-dimensional and three-dimensional scanning tool paths and an example lack of fusion that can be identified using the three-dimensional view.

FIG. 7 illustrates example two-dimensional and three-dimensional scanning tool paths 700, 750 and an example lack of fusion that can be identified using the three-dimensional view 750. For example, the 2D tool path 700 represents a limitation of known approaches that only provide a 2D view of multiple example scan paths 702 of a laser beam 110. In such a 2D view, it is not possible to identify any shape deviations and/or quality of the final 3D build. Using the methods and apparatus disclosed herein, a 3D scanning tool path 750 visualization permits identification of defect(s) 754, 756, and/or 758 in the 3D object build based on the selected parameter settings (e.g., laser speed, laser beam spot size, laser power, etc.), including a user-provided build strategy setting (e.g., use of contour areas, down-skin areas, bulk areas, etc.). For example, using the 3D scanning tool path 750 visualization, it is possible to identify areas that will result in a lack of fusion (e.g., not enough melted layers) that can contribute to the presence of openings and/or pores that introduce defects into the final built object. For example, based on the layer-by-layer geometry of the object to be 3D-printed (e.g., using a CAD file as input), as well as the known parameters of the laser to be used during the build process (e.g., spot size, laser power, scan speed), the 3D scanning tool path 750 visualization can be generated to view the scan path in 3D, using the melt pool shape 752 (e.g., depth 305, width 308). The visualization of the tool path 750 allows for a user to visually assess the expected quality of the build using the laser settings, or for a given system (e.g., 3D printing system) to independently identify any potential defects and/or correct for such defects by adjusting the laser parameters, thereby adjusting the melt pool shape 752. As such, given that the melt pool geometry 226 can be identified as described in connection with FIGS. 3A-3D, the 3D scanning tool path 750 allows for visualization of the melt pool shape 752, which can introduce additional microscopic structural features to the final 3D-printed object.

Figure 8:
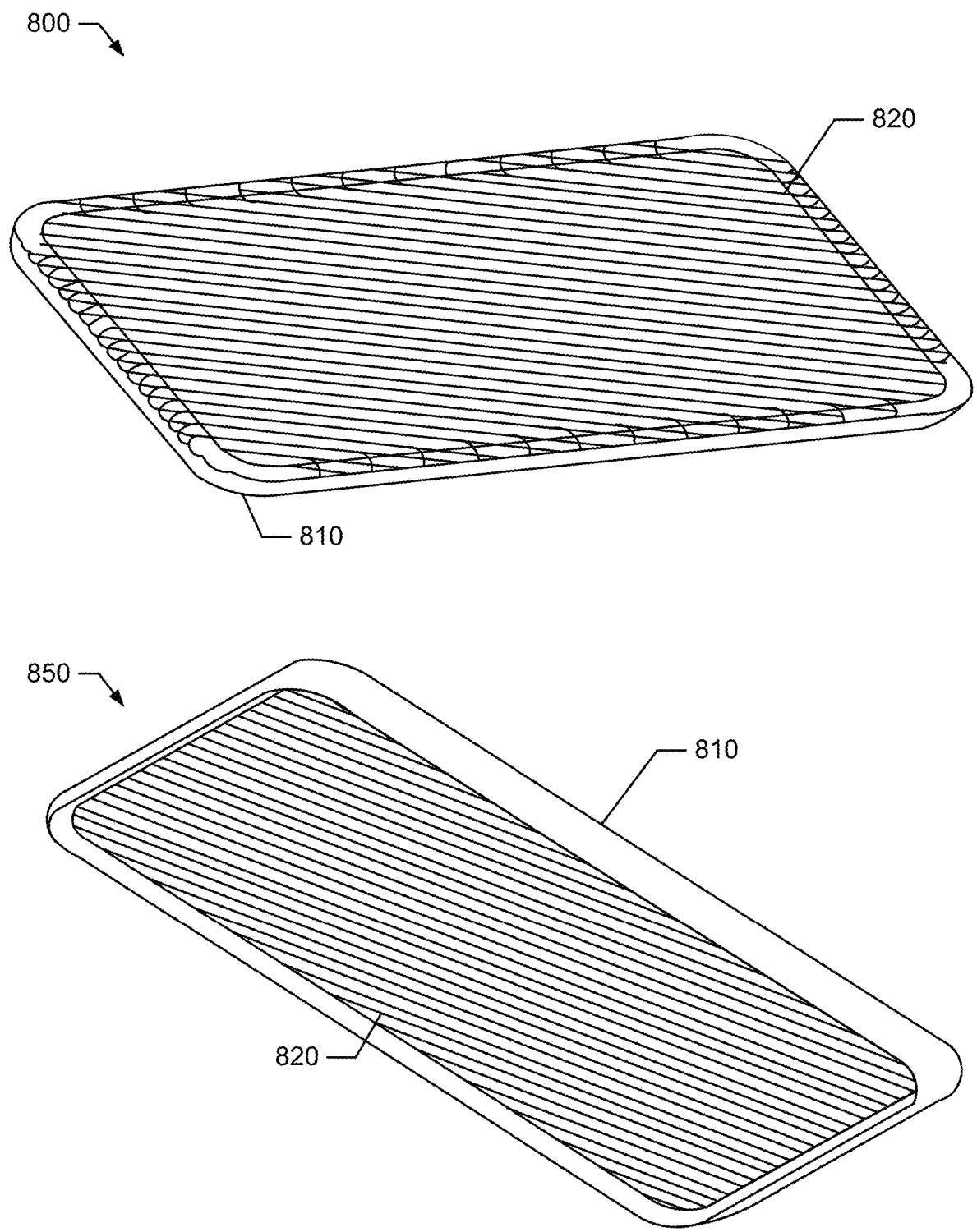
FIG. 8 illustrates example three-dimensional views of different parameter sets applied during a single build using the example additive manufacturing process of FIG. 1.

FIG. 8 illustrates example three-dimensional views 800, 850 of different parameter sets applied during a single build using the example additive manufacturing process 100 of FIG. 1. For example, different build strategies can include the use of contour areas, down-skin areas, and/or bulk areas as part of the build. Given an ability to visualize the scanning path in 3D, it is possible to further visualize the different parameter sets applied to a single build, including a build with an example contour scan path 810 that has a larger depth than an example hatch scan path 820, shown as part of the three-dimensional views 800, 850 of a single build. Such a difference in the object areas is not visible when using a 2D view. For example, in a 2D view of the scan path, only individual lines would be visible without taking into account the melt pool geometry 226 and its effect on the quality of the build. Conversely, 3D visualizations 800, 850 permit assessment of the build quality by using the melt pool geometry 226 to visualize the build using a variety of build strategies (e.g., contour areas, down-skin areas, etc.) which are not visible using a 2D view of the scan path. As such, based on the 3D views of the scan path, a user can adjust parameter settings and/or edit the scan path to eliminate and/or reduce lack of fusion, as well as presence of positive and/or negative deviations (e.g., as shown in FIG. 6B).

Figure 9:
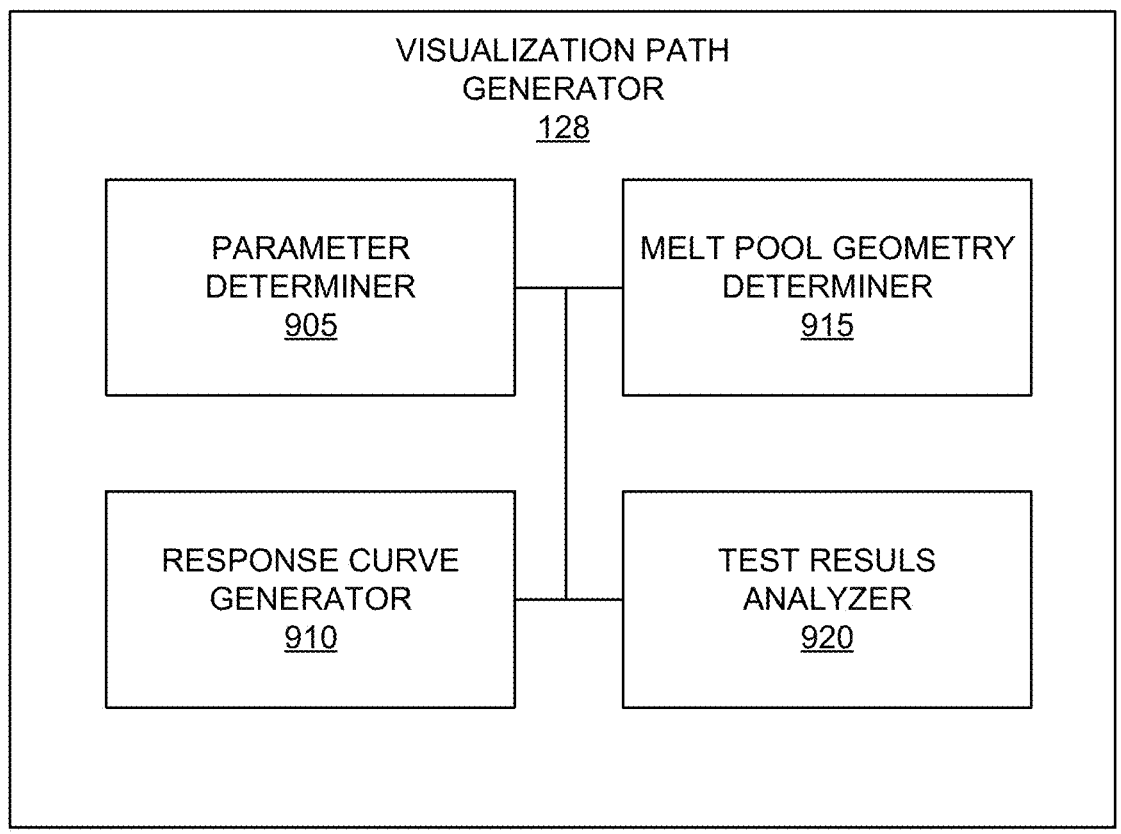
FIG. 9 is a block diagram of an example implementation of an example visualization path generator that can be implemented as part of the example additive manufacturing process of FIG. 1.

FIG. 9 is a block diagram of the visualization path generator 128 that can be implemented as part of the example additive manufacturing process 100 of FIG. 1. The visualization path generator 128 includes a parameter determiner 905, a response curve generator 910, a melt pool geometry determiner 915, and a test results analyzer 920.

The parameter determiner 905 can be used to determine and/or adjust settings for a specific parameter related to the electron beam and/or laser beam 110, including but not limited to laser beam size, laser speed, and/or laser power. In some examples, such parameter settings can be determined based on the type of 3D printing machine being used and/or other settings provided by a manufacturer. In some examples, such parameter settings are adjusted based on user input and/or adjustment. The parameter determiner 905 can further be used to determine parameters associated with a build strategy, such as introduction of areas of the build which include but are not limited to contour areas, downskin areas, and/or bulk areas. In some examples, the parameter determiner 905 adjusts parameters based on a performed assessment that can identify whether a certain parameter combination yields an improved quality of the final 3D build. In some examples, the parameter determiner 905 can provide and/or adjust parameter settings based on features of a given input model (e.g., a .STL file based on a CAD model) by comparing the input model to prior builds and parameters that previously provided a high quality build with eliminated and/or reduced defects, deficiencies, etc. In some examples, the parameter determiner 905 can adjust the parameter settings based on a given layer being built, such that settings for one layer of the build and/or one regions of the build can vary depending on the intended object microstructure. In some examples, the parameter determiner 905 can further be used to identify and/or adjust the number of melt layers that can be used to obtain a high quality build (e.g., avoid lack of fusion, positive deviations, and/or negative deviations).

The response curve generator 910 can be used to create one or more response curve model(s) based on provided processing condition inputs (e.g., laser speed, laser power, laser beam spot size, etc.) in order to determine a melt pool geometry using the melt pool geometry determiner 915. For example, the response curve generator 910 can generate a response curve model based on provided inputs in order to assess how the parameter settings can affect the final build. In some examples, the response curve generator 910 can generate a response curve model for a given laser beam 110 spot size, such that the spot size can change based on a given region and/or layer of the build. In some examples, the response curve generator 910 can output adjusted parameters that result in an increase or a decrease in specific melt pool geometry features (e.g., melt pool depth and/or melt pool width).

The melt pool geometry determiner 915 can determine melt pool geometry features (e.g., melt pool width and/or melt pool depth) using the response curve generator 910 and/or the parameter determiner 905. In some examples, the melt pool geometry determiner 915 can output the determined width and/or depth of the melt pool to allow for 2D and/or 3D visualization of the scanning toolpath using the identified melt pool geometry. For example, the melt pool geometry determiner 915 can be used to create a database of melt pool geometries based on a variety of parameter settings and/or build settings. In some examples, the melt pool geometry determiner 915 can adjust and/or modify the scanning toolpath used to create a 2D and/or 3D view of the build in order to account for identified regions that require changes in parameter settings and/or melt pool geometry changes (e.g., to reduce lack of fusion, eliminate negative deviation, etc.).

The test results analyzer 920 can be used to assess build quality based on given parameter settings. For example, the test results analyzer 920 can be used to determine build features such as surface roughness, density, porosity, etc. In some examples, the test results analyzer 920 determines whether one or more print parameters require modification to achieve a higher quality build result. In some examples, the test results analyzer 920 can be used to determine whether a given melt pool geometry and/or overall print parameters contribute to an increase in particle fusion and/or decrease in particle fusion, both of which can result in defects. For example, the test results analyzer 920 can determine the percentage of material volume that is melted given a specific number of melt layers used as part of the print settings. In some examples, the test results analyzer 920 can compare acquired results from previous printed models to determine which parameter settings contributed to an increase in build quality to allow for the final 3D built object to be a replica of the original CAD-based design. In some examples, the test results analyzer can be used to calculate overlaps between laser beam paths and determine specific parameters from response surface melt pool characteristics that improve the build process (e.g., avoid increased fusion). In some examples, the test results analyzer can further identify parameter limits, determine where in a processing window to focus on, and/or determine next optimizing steps based on limits of analysis.

For example, in operation, the visualization path generator 128 receives input regarding the laser beam 110 which is processed by the parameter determiner 905 to identify the laser beam parameters (e.g., laser power, laser spot size, scanning path, etc.). The melt pool geometry determiner 915 determines a melt pool geometry 226 (e.g., melt pool width and/or melt pool depth) based on the laser parameters identified by the parameter determiner 905. The visualization path generator 128 uses the generated melt pool geometry to output a 3D visualization of the scanning tool path, such that a user can visualize the object as it would be 3D-printed using the scanning tool path. The visualization path generator 128 identifies negative deviation(s) using the generated 3D scan path (e.g., based on the number of times a layer is melted using the given set of laser parameter settings). The visualization path generator 128 adjusts the laser parameters to remedy the negative deviation and/or to avoid negative deviation(s) in future processes. For example, the visualization path generator 128 uses the melt pool geometry determiner 915 to identify other melt pool geometries 226 that would be more suitable to a specific additive manufacturing process (e.g., type of object being built, type of printer settings that are not adjustable, material properties of the selected material for the 3D printing process, etc.). The visualization path generator 128 uses the test results analyzer 920 to quantify the expected quality of the anticipated build using a specific melt pool geometry 226 (e.g., percentage of porosity, percentage of material fusion, etc.). While an example manner of implementing the visualization path generator 128 is illustrated in FIG. 9, one or more of the elements, processes and/or devices illustrated in FIG. 9 may be combined, divided, re-arranged, omitted, eliminated and/or implemented in any other way. Further, the example parameter determiner 905, the example response curve generator 910, the example melt pool geometry determiner 915, the example test results analyzer 920, and/or, more generally, the example visualization path generator 128 of FIG. 9 may be implemented by hardware, software, firmware and/or any combination of hardware, software and/or firmware. Thus, for example, any of the parameter determiner 905, the example response curve generator 910, the example melt pool geometry determiner 915, the example test results analyzer 920, and/or, more generally, the example visualization path generator 128 of FIG. 9 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example parameter determiner 905, the example response curve generator 910, the example melt pool geometry determiner 915, the example test results analyzer 920, and/or, more generally, the example visualization path generator 128 of FIG. 9 is/are hereby expressly defined to include a non-transitory computer readable storage device or storage disk such as a memory, a digital versatile disk (DVD), a compact disk (CD), a Blu-ray disk, etc. including the software and/or firmware. Further still, the example visualization path generator 128 may include one or more elements, processes and/or devices in addition to, or instead of, those illustrated in FIG. 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
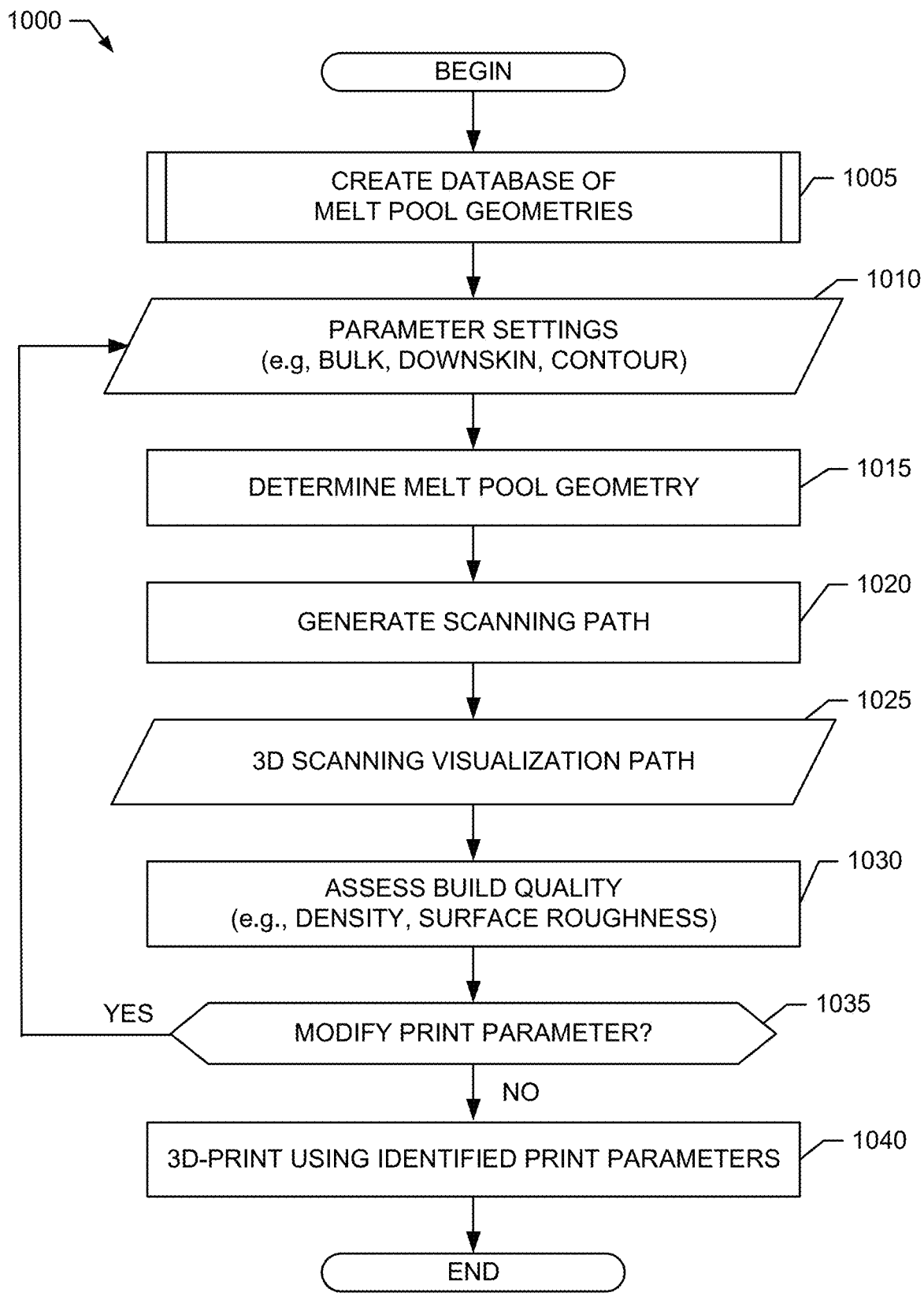
FIG. 10 illustrates a flowchart representative of example machine readable instructions which may be executed to implement the example visualization path generator of FIG. 9.
Figure 11:
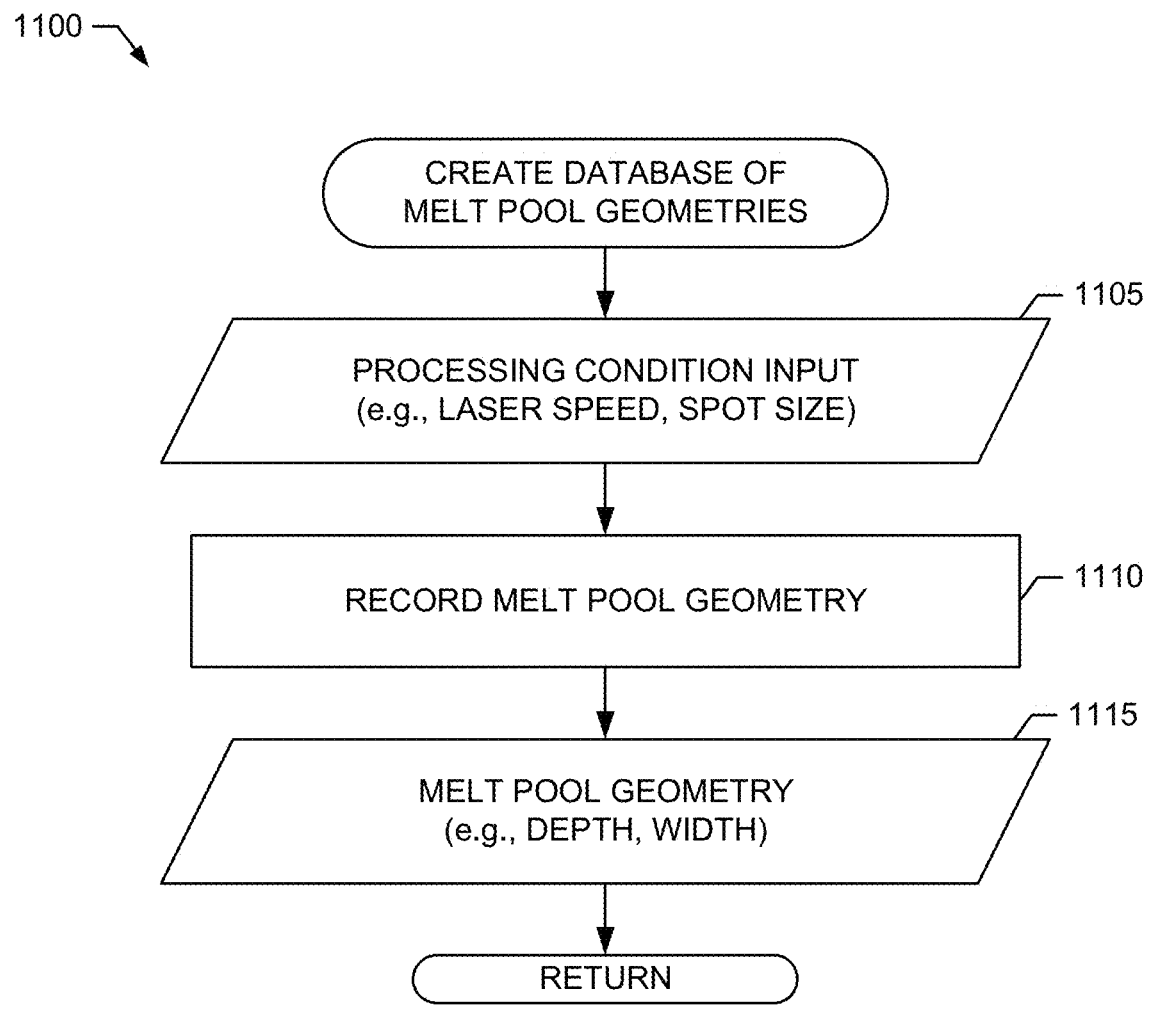
FIG. 11 illustrates a flowchart representative of example machine readable instructions which may be executed to implement the example melt pool geometry determiner of FIG. 9.

Flowcharts representative of example hardware logic, machine readable instructions, hardware implemented state machines, and/or any combination thereof for implementing the visualization path generator 128 of FIG. 9 are shown in FIGS. 10-11. The machine readable instructions may be one or more executable programs or portion(s) of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 10-11, many other methods of implementing the example visualization path generator 128 of FIG. 9 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 10-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 10 illustrates a flowchart representative of example machine readable instructions 1000 which may be executed to implement the example visualization path generator 128 of FIG. 9. A melt pool geometry determiner 915 creates a database of melt pool geometries based on input parameter settings (e.g., laser speed, spot size, laser power identified by the parameter determiner 905) using the response curve generator 910 (block 1005). Once a database of melt pool geometries exists for various parameter settings, additional build settings (e.g., bulk areas, down-skin areas, contour areas of the build, etc.) are provided as input using user-based input and/or the parameter determiner 905 (block 1010). For example, the parameter determiner 905 can determine the build settings based on the input object model (e.g., .STL file from a CAD model). Based on the input build parameters and provided parameter settings, the melt pool geometry determiner 915 determines the melt pool geometry based on the given conditions (block 1015). In some examples, the melt pool geometry determiner 915 varies the melt pool geometry (e.g., width and/or depth) based on the additional build settings on a layer-by-layer basis and/or based on the region of the object being fabricated. The visualization path generator 128 generates a 3D scanning path to allow for a user, system, application, interface, etc., to visualize the object to be fabricated on a layer-by-layer basis (block 1025). For example, the visualization path generator 128 provides a 2D and/or a 3D view of the scanning path to allow the user to identify areas that may require parameter setting modification. In other examples, the visualization path generator 128 can automatically re-set the laser 110 parameters to generate a scanning path that reduces presence of defects in the final 3D-printed object (e.g., allows for the 3D-printed object to be as close a reproduction of the original CAD-based file input as possible). In some examples, the test results analyzer 920 assesses the build quality (e.g., surface roughness, density, porosity, etc.) (block 1030). In some examples, the test results analyzer 920 modifies the print parameter(s) to improve build quality (block 1035). Once a print parameter has been modified, the parameter settings for the build are input, and the melt pool geometry determiner 915 proceeds to determine the melt pool geometry based on the changed parameters using the melt pool geometry database. The visualization path generator 128 can therefore be used to modify the 3D printing parameters prior to the object being 3D printed using the additive manufacturing process 100 of FIG. 1 (block 1040). As such, the visualization path generator 128 permits a more controlled and predictable 3D printing process given that the 3D-printer parameters (e.g., laser parameters) are considered in advance of a given object being built and/or manufactured in order to account for changes in the object microstructure and/or morphology that would otherwise not be noticed until after the 3D printing has been completed. The unique melt pool geometry 226 generated by the visualization path generator 128 when identifying the laser-specific parameters of a given 3D printer permit a user and/or the visualization path generator 128 to adjust the settings in order to yield a 3D printed object that most closely approximates the desired structure of the 3D printed object intended by the user and/or established manufacturing standards. As such, the visualization path generator 128 used in combination with the additive manufacturing process 100 reduces the time and cost (e.g., material costs, 3D-printer associated costs, etc.) needed to manufacture 3D printed objects and/or parts that are highly consistent with the initially-designed objects and/or parts (e.g., as based on the original computer-based model).

FIG. 11 illustrates a flowchart representative of example machine readable instructions 1100 which can be executed to implement the example melt pool geometry determiner 915 of FIG. 9 to create a database of melt pool geometries (e.g., block 1005 in the example flow diagram 1000 of FIG. 10). The melt pool geometry determiner 915 creates a database of melt pool geometries based on input parameter settings and/or by processing condition inputs (e.g., laser speed, laser power, laser beam spot size, etc.) (block 1105). In some examples, such parameters can be identified using the parameter determiner 905. In some examples, the parameters can be provided by a user. The melt pool geometry determiner 915 records melt pool geometry (block 1110) based on outputs provided by the response curve generator 910, including melt pool depth and/or melt pool width (block 1115). In some examples, the melt pool geometry can be determined using assessments other than a response curve model. In some examples, the melt pool geometry database can include melt pool geometries generated as part of previous builds. In operation, once a CAD model of an object and/or part to be 3D printed using the additive manufacturing process 100 of FIG. 1 is input to a 3D printer, the parameter determiner 905 determines laser parameters (e.g., speed, spot size, power) associated with the given 3D printer. In some examples, the laser parameters can include a range for each setting (e.g., speed range of a laser for a given printer may be 400-1600 mm/s). Using the parameter range, the melt pool geometry determiner 915 generates a potential range of melt pool geometries based on a set of given laser parameters. The visualization path generator 128 generates a 3D view of the scan path to determine which set of parameters most closely replicates the original design provided using an input CAD model. The visualization path generator 128 uses the test results analyzer 920 to determine, for example, the percentage porosity, the percentage of layers with adequate particle fusion, etc. Based on the test results analyzer 920 output, the visualization path generator 128 selects the laser parameters that are determined to allow for the highest quality build (e.g., most closely replicating the CAD model). To allow for a user to interact directly with the 3D printing process, the visualization path generator 128 outputs a visual representation of the 3D scan path view for the user, allowing for manual adjustments of the laser parameters if needed.

Figure 12:
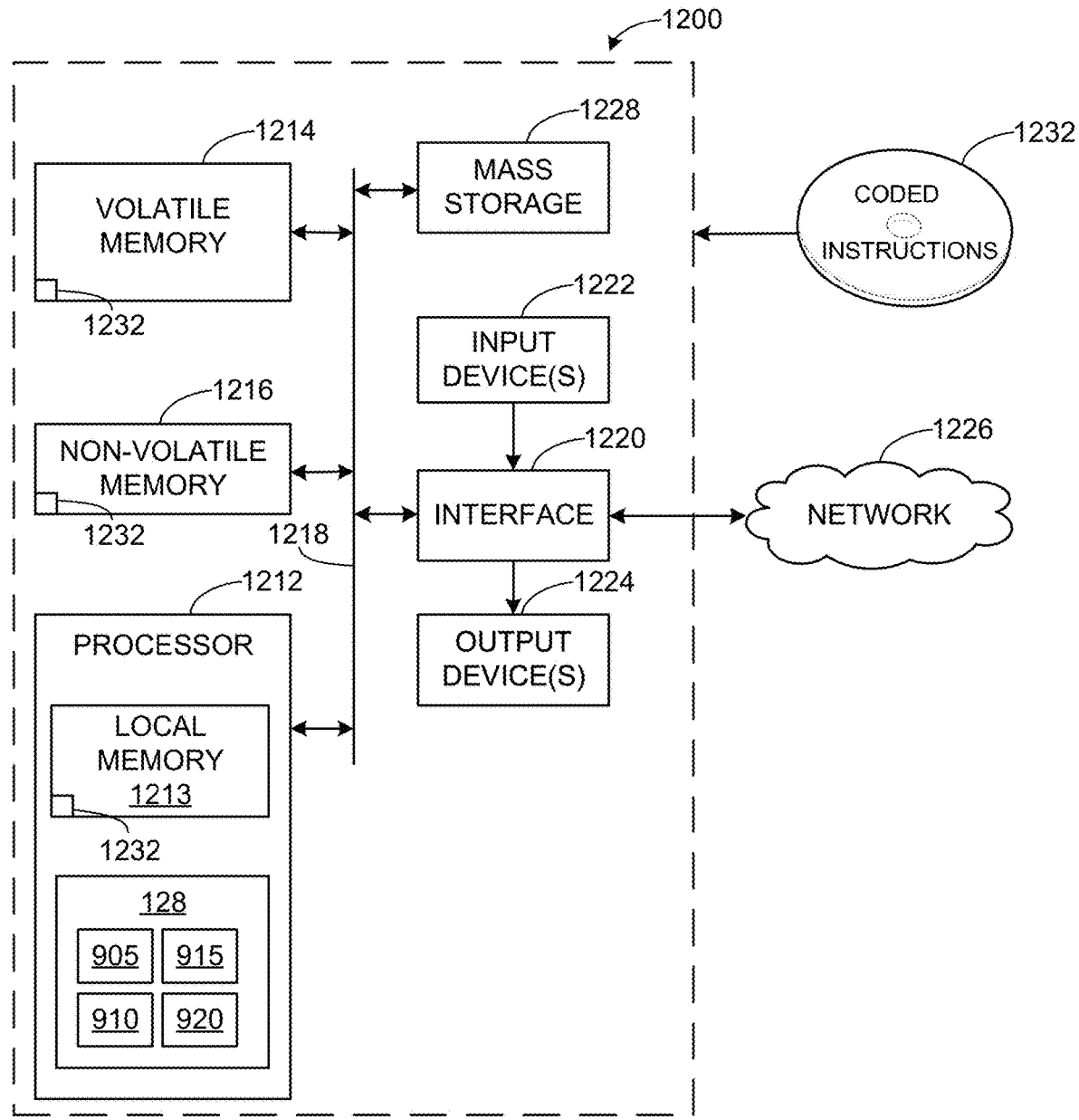
FIG. 12 is a block diagram of an example processing platform structured to execute the instructions of FIGS. 10-11 to implement the example visualization path generator of FIG. 9.
Figure 9:
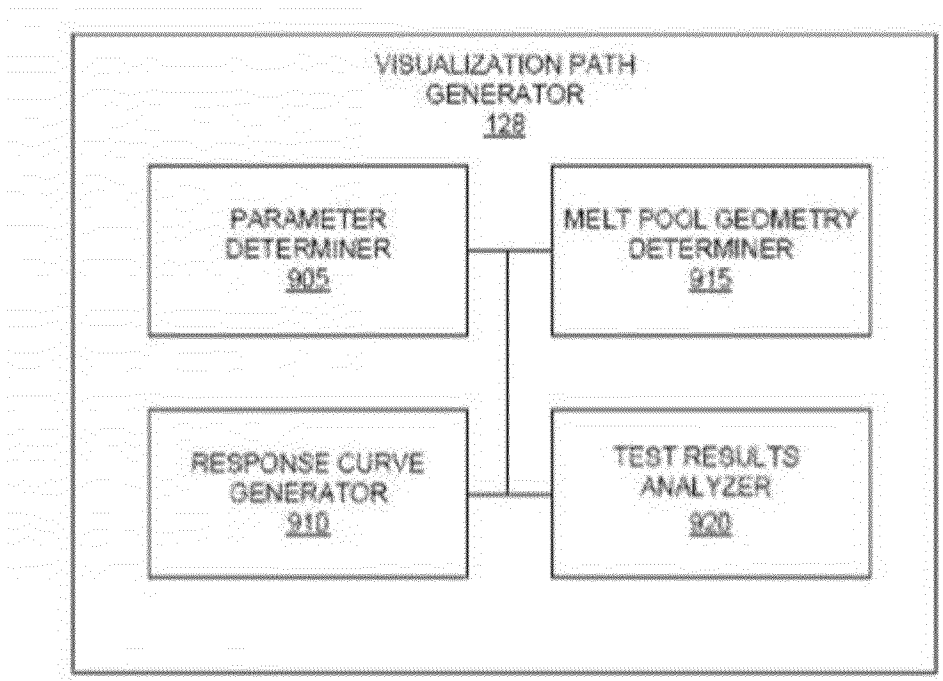

FIG. 12 is a block diagram of an example processing platform structured to execute the instructions of FIGS. 10-11 to implement the example visualization path generator of FIG. 9. The processor platform 1200 can be, for example, a server, a personal computer, a workstation, a self-learning machine (e.g., a neural network), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the example parameter determiner 905, the example response curve generator 910, the example melt pool geometry determiner 915, and the example test results analyzer 920.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) 1222 can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 10-11 may be stored in the mass storage device 1228, in the volatile memory 1214, in the non-volatile memory 1216, and/or on a removable non-transitory computer readable storage medium such as a CD or DVD.

From the foregoing, it will be appreciated that methods and apparatus described herein permit 2D and 3D scanning path visualization as part of the 3D printing process. Example methods and apparatus disclosed herein permit users to directly assess a relationship between parameter sets and the resulting quality of the build (e.g., the final 3D printed object). For example, users can visualize a laser powder bed DMLM scan path in 2D and 3D based on measured and/or predicted melt pool geometries. Current techniques rely on the visualization of a scan path based on one-dimensional (1D) vectors in a layer-by-layer view, limiting the amount of information accessible to the user. In the examples disclosed herein, melt pool information can be used to generate 2D and 3D scanning paths based on input from CAD models. The examples disclosed herein permit visualization of not only the scan path itself, but also the anticipated quality of the 3D printed parts and/or objects (e.g., build density, surface roughness, porosity, etc.). Methods and apparatus disclosed herein can be implemented in any applicable additive manufacturing process (e.g., electron beam melting, etc.).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   instructions in the apparatus; and
   processor circuitry to execute the instructions to:
   determine at least one of a first laser beam parameter setting or a first electron beam parameter setting;
   identify melt pool dimensions using the at least one of the first laser beam parameter setting or the first electron beam parameter setting, the at least one of the first laser beam parameter setting or the first electron beam parameter setting varied to obtain multiple melt pool dimensions, the multiple melt pool dimensions including variable melt pool width or variable melt pool depth;
   identify at least one response surface model based on the multiple melt pool dimensions to determine an effect of the variations of the at least one of the first laser beam parameter setting or the first electron beam parameter setting on the melt pool dimensions;
   output a three-dimensional model of a scanning path for an additive manufacturing process using the at least one response surface model, the at least one response surface model including a first transfer function to determine a melt pool depth and a second transfer function to determine a melt pool width; and
   adjust the at least one of the first laser beam parameter setting or the first electron beam parameter setting based on the three-dimensional model to identify a second laser beam parameter setting or a second electron beam parameter setting, the at least one of the second laser beam parameter setting or the second electron beam parameter setting used to at least one of increase fusion, decrease fusion, or decrease burn back of a build using the additive manufacturing process to improve three-dimensional build quality.

2. The apparatus of claim 1, wherein the processor circuitry is to generate the at least one response surface model used to determine the melt pool dimensions.

3. The apparatus of claim 2, wherein the processor circuitry is to receive the first laser beam parameter setting or the first electron beam parameter setting, the first laser beam parameter setting or the first electron beam parameter setting including at least one of a laser beam spot size, a laser power, and a laser speed.

4. The apparatus of claim 1, wherein the three-dimensional model includes a contour area, a bulk area, or a down-skin area.

5. The apparatus of claim 1, wherein the three-dimensional model permits display of build areas showing a lack of fusion or excess melting.

6. The apparatus of claim 1, wherein the processor circuitry is to generate a three-dimensional view of a scanning path based on a number of melt layers.

7. The apparatus of claim 6, wherein the processor circuitry is to output a percentage of material volume melted per the number of melt layers.

8. The apparatus of claim 1, further including a laser source to initiate the additive manufacturing process based on the output.

9. A method comprising:
   determining at least one of a first laser beam parameter setting or a first electron beam parameter setting;
   identifying melt pool dimensions using the at least one of the first laser beam parameter setting or the first electron beam parameter setting, the at least one of the first laser beam parameter setting or the first electron beam parameter setting varied to obtain multiple melt pool dimensions, the multiple melt pool dimensions including variable melt pool width or variable melt pool depth;
   identifying at least one response surface model based on the multiple melt pool dimensions to determine an effect of the variations in the at least one of the first laser beam parameter setting or the first electron beam parameter setting on the melt pool dimensions;
   outputting a three-dimensional model of a scanning path for an additive manufacturing process using the at least one response surface model, the at least one response surface model including a first transfer function to determine a melt pool depth and a second transfer function to determine a melt pool width; and
   adjusting the at least one of the first laser beam parameter setting or the first electron beam parameter setting based on the three-dimensional model to identify a second laser beam parameter setting or a second electron beam parameter setting, the at least one of the second laser beam parameter setting or the second electron beam parameter setting used to at least one of increase fusion, decrease fusion, or decrease burn back of a build using the additive manufacturing process to improve three-dimensional build quality.

10. The method of claim 9, further including generating the at least one response surface model used to determine the melt pool dimensions.

11. The method of claim 10, further including receiving the first laser beam parameter setting or the first electron beam parameter setting, the first laser beam parameter setting or the first electron beam parameter setting including at least one of a laser beam spot size, a laser power, and a laser speed.

12. The method of claim 9, wherein the three-dimensional geometric model includes a contour area, a bulk area, or a down-skin area.

13. The method of claim 9, further including displaying build areas showing a lack of fusion or excess melting.

14. The method of claim 9, further including generating a three-dimensional view of a scanning path based on a number of melt layers.

15. The method of claim 14, further including outputting a percentage of material volume melted per the number of melt layers.

16. A non-transitory computer readable storage medium comprising instructions that, when executed, cause a processor to at least:
   determine at least one of a first laser beam parameter setting or a first electron beam parameter setting;
   identify melt pool dimensions using the at least one of the first laser beam parameter setting or the first electron beam parameter setting, the at least one of the first laser beam parameter setting or the first electron beam parameter setting varied to obtain multiple melt pool dimensions, the multiple melt pool dimensions including variable melt pool width or variable melt pool depth;
   identify at least one response surface model based on the multiple melt pool dimensions to determine an effect of the variation in the at least one of the first laser beam parameter setting or the first electron beam parameter setting on the melt pool dimensions;
   output a three-dimensional model of a scanning path for an additive manufacturing process using the at least one response surface model, the at least one response surface model including a first transfer function to determine a melt pool depth and a second transfer function to determine a melt pool width; and
   adjust the at least one of the first laser beam parameter setting or the first electron beam parameter setting based on the three-dimensional model to identify a second laser beam parameter setting or a second electron beam parameter setting, the at least one of the second laser beam parameter setting or the second electron beam parameter setting used to at least one of increase fusion, decrease fusion, or decrease burn back of a build using the additive manufacturing process to improve three-dimensional build quality.

17. The non-transitory computer readable storage medium of claim 16, wherein the instructions, when executed, cause a processor to generate the at least one response surface model used to determine the melt pool dimensions.

18. The non-transitory computer readable storage medium of claim 17, wherein the instructions, when executed, cause a processor to receive the first laser beam parameter setting or the first electron beam parameter setting, the first laser beam parameter setting or the first electron beam parameter setting including at least one of a laser beam spot size, a laser power, and a laser speed.

19. The non-transitory computer readable storage medium of claim 16, wherein the instructions, when executed, cause a processor to display build areas showing a lack of fusion or excess melting.

* * * * *

UNITED STATES PATENT AND TRADEMARK OFFICE
CERTIFICATE OF CORRECTION

PATENT NO. : 11,537,111 B2
APPLICATION NO. : 16/837721
DATED : December 27, 2022
INVENTOR(S) : Yang et al.

Page 1 of 2

It is certified that error appears in the above-identified patent and that said Letters Patent is hereby corrected as shown below:

In the Drawings

Sheet 10, Fig. 9, under reference numeral 920, the text should read "RESULTS" instead of "RESULS." (As shown on the attached drawing sheet)

Signed and Sealed this
Thirteenth Day of February, 2024

Katherine Kelly Vidal
*Director of the United States Patent and Trademark Office*